United States Patent
Favilli et al.

(10) Patent No.: US 9,481,843 B2
(45) Date of Patent: Nov. 1, 2016

(54) APPARATUS FOR SWEETENING AND/OR DEHYDRATING A HYDROCARBON GAS, IN PARTICULAR A NATURAL GAS

(71) Applicant: SIME SRL, Rosignano Solvay (LI) (IT)

(72) Inventors: Stefano Favilli, Rosignano Marittimo (IT); Luciano Scibola, Crema (IT)

(73) Assignee: SIME SRL, Rosignano Solvay (LI) (IT)

( * ) Notice: Subject to any disclaimer, the term of this patent is extended or adjusted under 35 U.S.C. 154(b) by 0 days.

(21) Appl. No.: 14/989,893

(22) Filed: Jan. 7, 2016

(65) Prior Publication Data

US 2016/0115408 A1 Apr. 28, 2016

Related U.S. Application Data

(62) Division of application No. 14/000,424, filed as application No. PCT/IB2012/050794 on Feb. 21, 2012, now Pat. No. 9,273,261.

(30) Foreign Application Priority Data

Feb. 21, 2011 (IT) .................. PI2011A0018

(51) Int. Cl.
```
B01D 53/18      (2006.01)
C10L 3/10       (2006.01)
B01D 3/14       (2006.01)
B01D 53/14      (2006.01)
B01D 53/26      (2006.01)
```
(52) U.S. Cl.
CPC .............. *C10L 3/103* (2013.01); *B01D 3/141* (2013.01); *B01D 53/1462* (2013.01); *B01D 53/18* (2013.01); *B01D 53/263* (2013.01); *C10L 3/101* (2013.01); *C10L 3/102* (2013.01); *C10L 3/104* (2013.01); *C10L 3/106* (2013.01); *B01D 2251/304* (2013.01); *B01D 2251/604* (2013.01); *B01D 2252/2023* (2013.01); *B01D 2252/2026* (2013.01); *B01D 2252/20484* (2013.01); *B01D 2252/20489* (2013.01); *B01D 2257/304* (2013.01); *B01D 2257/504* (2013.01); *B01D 2257/80* (2013.01); *B01D 2258/02* (2013.01); *B01D 2258/05* (2013.01); *C10L 2290/541* (2013.01); *Y02P 70/34* (2015.11)

(58) Field of Classification Search
None
See application file for complete search history.

(56) References Cited

U.S. PATENT DOCUMENTS

2013/0019530 A1* 1/2013 Favilli .................... B01D 3/141
                                                         48/127.5

* cited by examiner

*Primary Examiner* — Tam N Nguyen

(74) *Attorney, Agent, or Firm* — Ladas & Parry LLP

(57) ABSTRACT

An apparatus for actuating method for removing acidity and/or moisture from a hydrocarbon gas, by absorption into a sweetening liquid and into a dehydration liquid, that are adapted to extract acid compounds or water from the gas, respectively. The apparatus includes at least such a container and a gas convey selective convey means, for actuating the treatment modes, in particular responsive to a flowrate of the gas. The apparatus according to the invention allows to maintain the sweetening and/or dehydration efficiency, in particular in the case of a progressive reduction of the flowrate of natural gas that can be obtained from a well or gasfield.

16 Claims, 11 Drawing Sheets

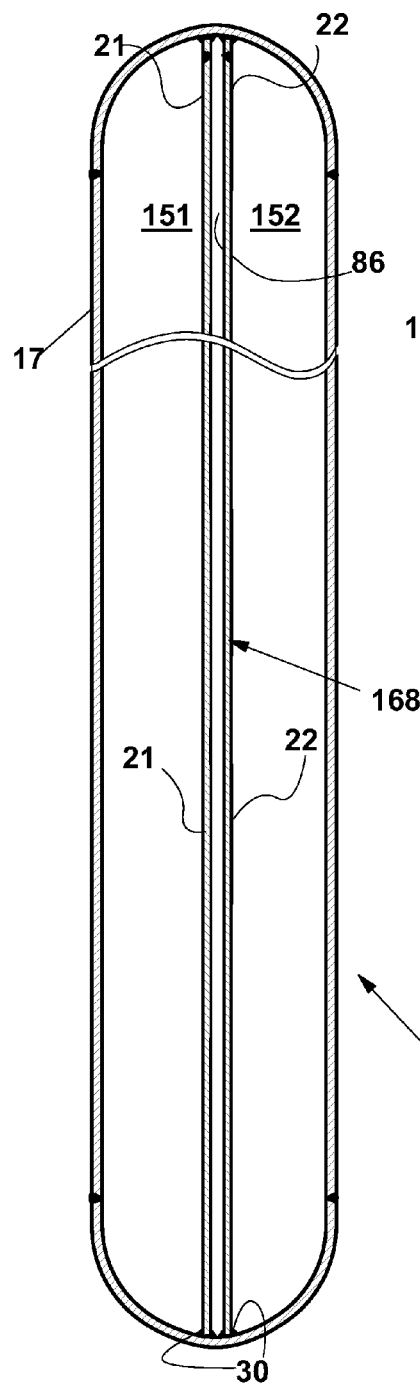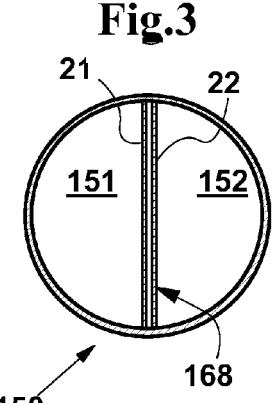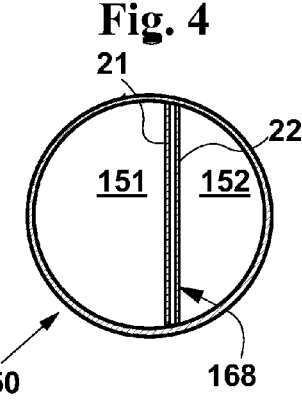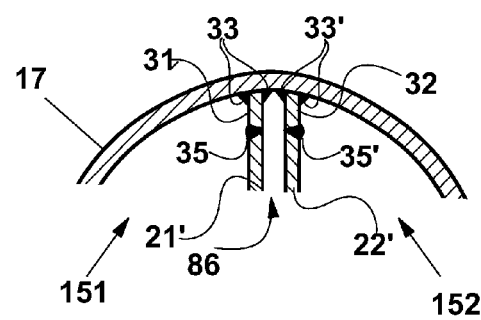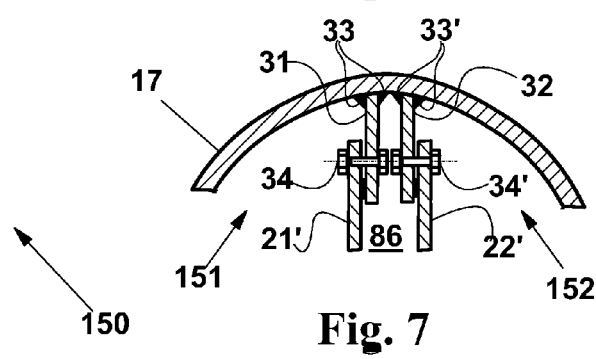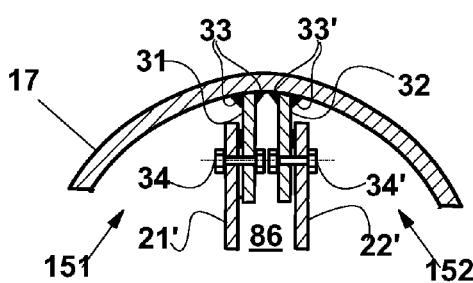

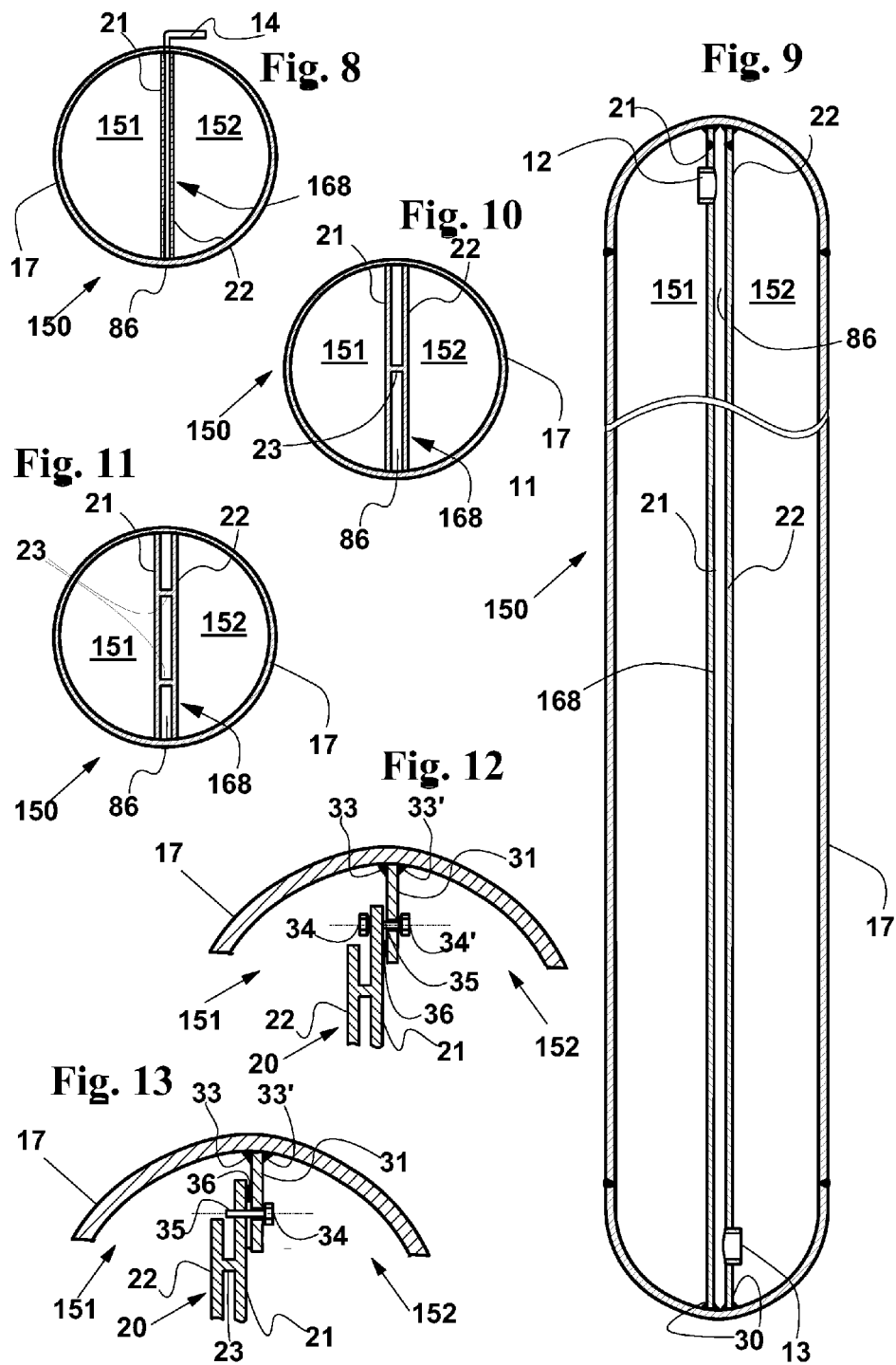

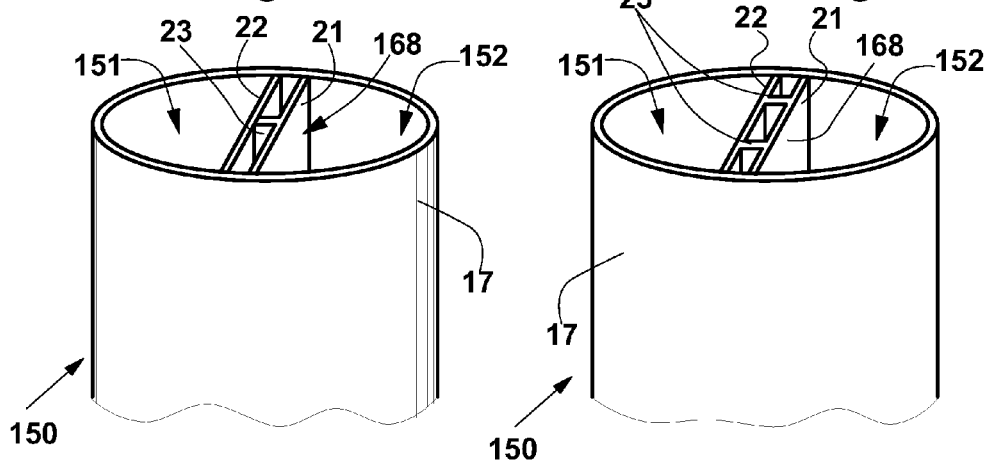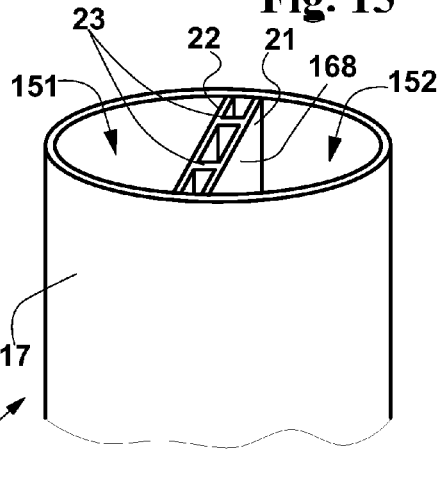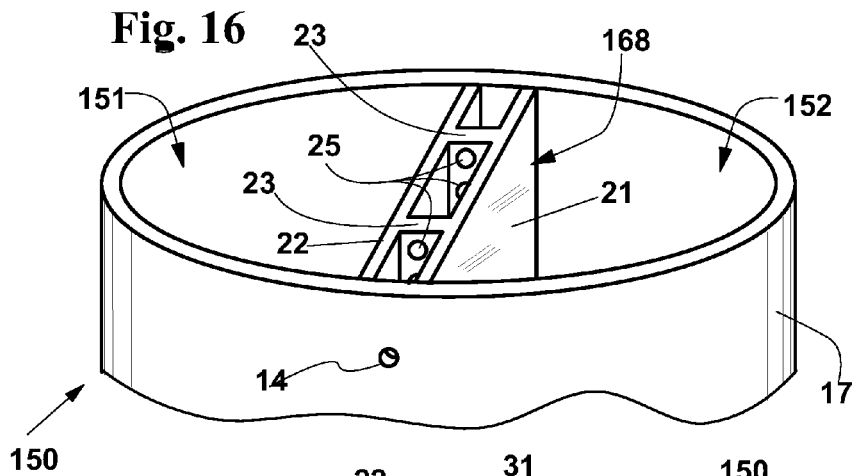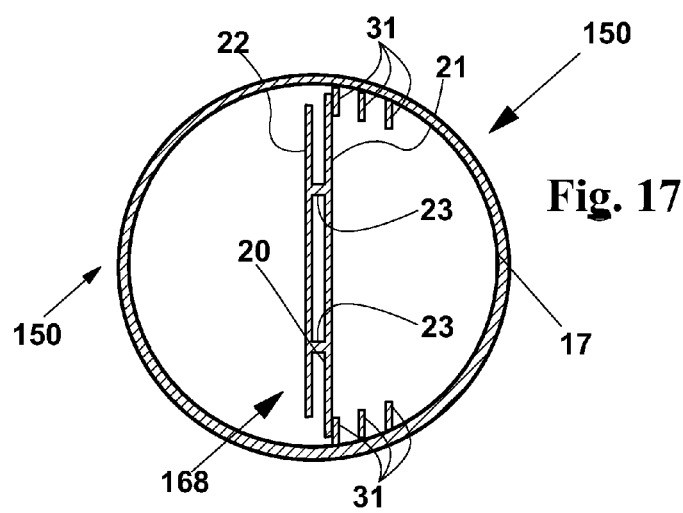

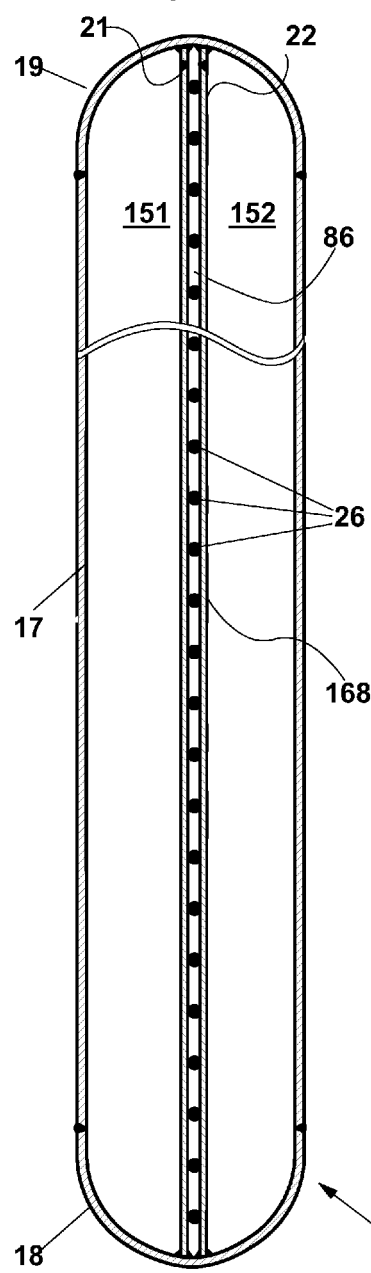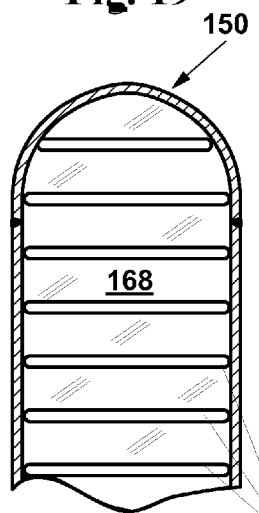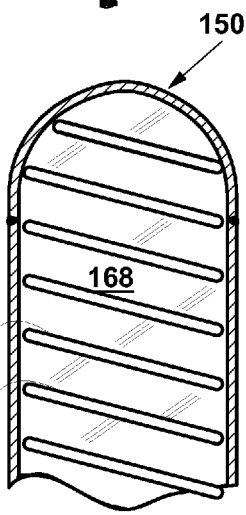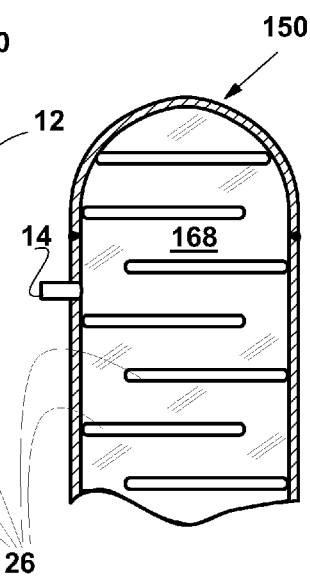

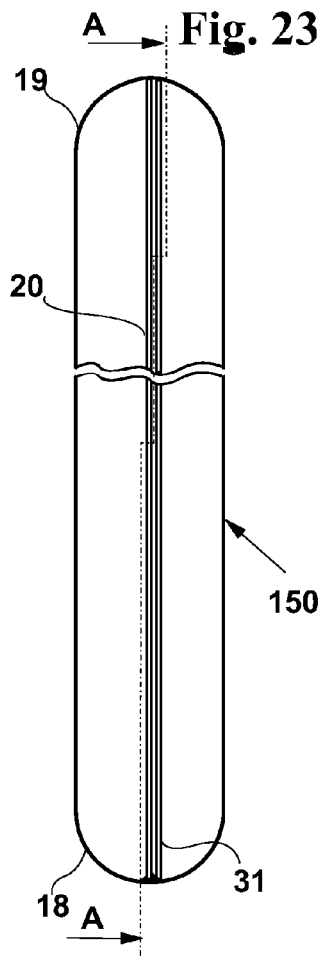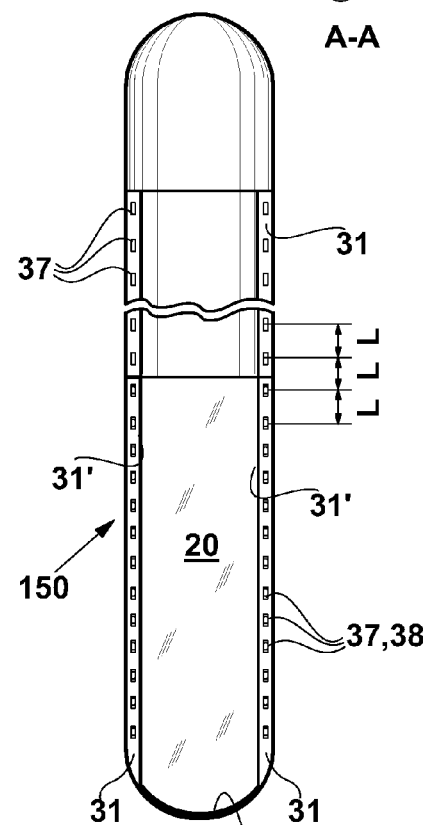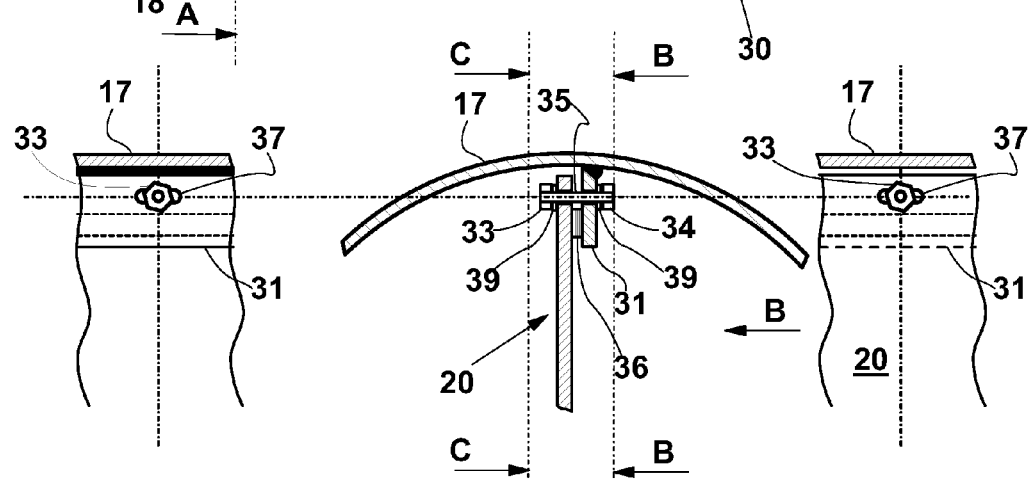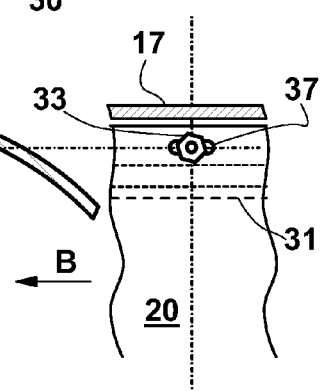
Fig. 23
Fig. 24
A-A
Fig. 26
B-B
Fig. 25
Fig. 27
C-C

A-A

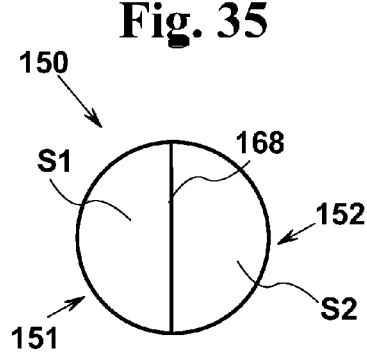
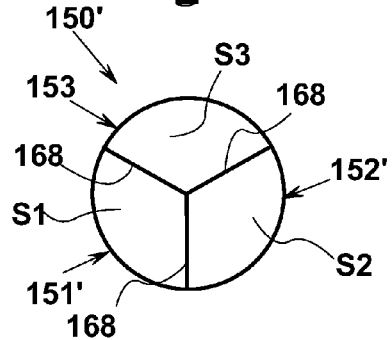
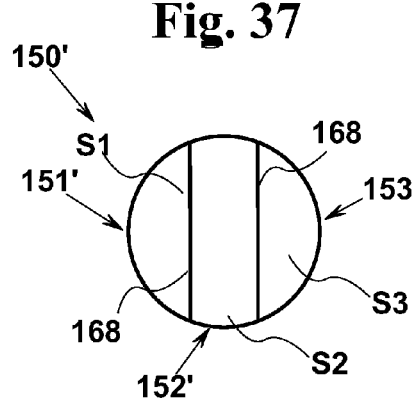
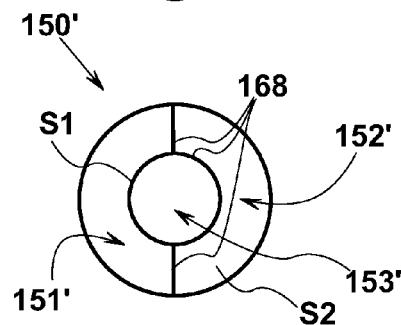
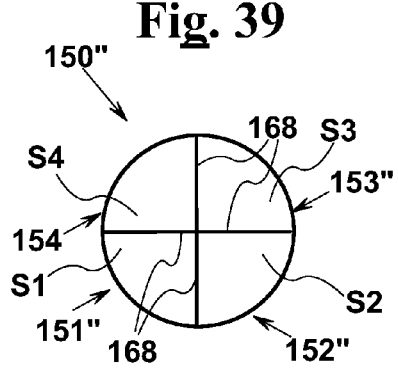
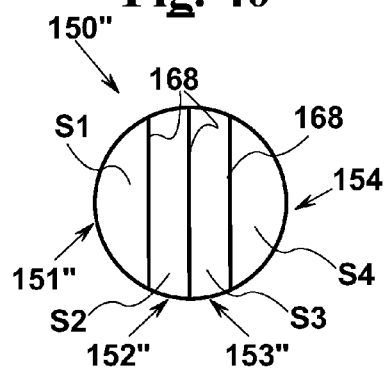

APPARATUS FOR SWEETENING AND/OR DEHYDRATING A HYDROCARBON GAS, IN PARTICULAR A NATURAL GAS

SCOPE OF THE INVENTION

The present invention relates to a method and to an apparatus for removing acid compounds, in particular for removing sulphur compounds (sweetening) and/or moisture (dehydration) from a hydrocarbon gas, by absorption into respective absorption liquids.

In particular, the method and the apparatus are adapted to treat a natural gas as this is extracted from a gas extraction unit that comprises at least one well.

BACKGROUND OF THE INVENTION

The raw natural gas, as extracted from wells, often contains acid compounds, in particular carbon dioxide and hydrogen sulfide. The natural gas may also contain moisture. The acid compounds, in combination with the moisture make the gas aggressive to the materials of the equipment in which the gas has to be stored and/or transformed. Furthermore, the acid compounds make the gas unsuitable for a large number of uses.

Nevertheless, the moisture may cause ice and hydrocarbon hydrates to form, when the gas is expanded after extraction. The ice can block passageways, and damage the equipment and the piping.

The water that is present in the gas may also form corrosive pools within the gas pipelines.

The same problems also occur with other fuel-gas mixtures, for example light gas fractions from crude oil atmospheric distillation.

Therefore, it is often necessary to remove acid compounds and/or moisture from hydrocarbon fuel gas, in particular from natural gas, immediately after extraction.

For removing the acid compounds, i.e. for "sweetening" the gas, absorption operations are normally carried out in which the gas is absorbed into an alkali-containing liquid, for example into a solution of an organic base that is able to chemically combine with the adsorbed compounds.

For dehydrating the natural gas that is extracted from a well at a pressure normally set between 1 and 300 bar absolute, processes are normally used of absorption into a hygroscopic liquid, preferably into a regenerable liquid, for instance into a glycol such as triethylene glycol (TEG).

According to the most common technique, the gas is treated first in a sweetening tower, and then in a dehydration tower.

A typical sweetening and dehydration combined process is described, for instance, in U.S. Pat. No. 4,150,962. This process provides an amine-based liquid in which the acid compounds are absorbed, and a glycol for the dehydration. As also disclosed in WO 2011/121423, the sweetening and dehydration steps are carried out in respective absorption chambers that are defined within a tower, and that are separated by an inner longitudinal partition wall.

In many cases, the flowrate of the gas that has to be treated changes remarkably with time. In particular, in the case of natural gas wells, the extraction flowrate significantly decreases during the life of the well. The sweetening and/or dehydrating apparatus of the type described in the cited documents comprises absorption towers or chambers in which the passage cross-section is selected on the basis of the maximum gas flowrate that the well can produce. Such towers cannot effectively treat a very low flowrate, such as the flowrate that may generally be extracted after even a few years of life of the well.

This is a particularly relevant problem if packed towers are used. Packed towers, in fact, are less sensitive to process gas flowrate variation than plate towers are. Packed towers are a substantially an unavoidable choice in the case of towers to be installed on deepwater platforms, such as Tension Leg Platform (TLP), or on other floating facilities, i.e. Floating Platforms or generically Floating Production Systems (FPO). In fact, the movement of the platforms caused by the waves does not allow to operate plate towers, or makes it disadvantageous, because plate towers do not allow a steady liquid hold-up to be maintained on the trays.

A relevant flowrate change may occur also when treating hydrocarbon gas such as refinery or cookery gas fractions, petrochemical processes gas streams, chemical synthesis gas or biogas that are produced by degradation and/or fermentation processes. Particularly low gas flowrates may occur, for instance, in case of plants that work at a reduced rate.

GB 2111852 describes an apparatus to cause a contact between a gas and a liquid, which comprises: an outer shell with a spherical shape or a closed end cylindrical shape; at least one partition positioned vertically within the shell, in order to form at least two separate spaces within the shell; a gas-liquid contact means mounted in each space; openings for introducing and withdrawing the gas and/or a liquid into/from such spaces. The apparatus also comprises gas and/or liquid passages that connect such spaces in a series, parallel or in series/parallel arrangement. The apparatus is conceived to limit the height-to-diameter ratio, in particular, in order to resist seismic forces and also to facilitate transport. In case of a cylindrical shell, the height-to-diameter ratio is lower than 7, preferably it is lower than 5. This is clearly due to particular earthquake conditions that are likely to take place in Japan, whereas conditions are known in which said ratio could be exceeded. This is obtained by placing side-by-side tower portions that, in a single-tower arrangement, would be arranged as the prolongation of each other. Accordingly, this way to reduce the height of the tower unavoidably increases its overall lateral dimensions, which is a disadvantage in an installation on structures that have a limited space availability.

Such an apparatus is not well-suited for sweetening/dehydration operations of a large number of gases that require such treatment. For example, most active extraction units, both gas and gas/oil extraction units, produce a gas streams that contain high amounts of undesirable substances and, in particular, hydrogen sulfide: this is the case of the gas from Caspian Sea extraction units (Kashagan), which may contain $H_2S$ amounts up to 18-20% in moles. In these cases, more complex sweetening towers are required, which have a large number of theoretical plates, in a non-extreme case of gas produced by the above-indicated extraction units up to 24 plates may be required, yet in a relatively mild treatment to obtain a gas that is not intended for specific catalytic chemical processes, i.e. a treatment in which a purity degree of about 5-6 ppm $H_2S$ may be enough, as in the case of a gas to be burnt in an industrial or home combustion plant.

In this case, if a plate height of about 500 mm is assumed, the mass exchange zone alone be as high as about 12-15 meters, which can bring at an overall tower height of about 15-18 meters, considering top and bottom distribution devices, and the shell portions and bottoms that are needed for them. A maximum height to diameter ratio of 7:1, as in GB 2111852, would mean a minimum diameter of 2.1-2.6 meters; such a value may be largely sufficient in comparison to what is required by a flowrate that may be reasonably treated in a sweetening unit. Even larger heights and therefore the pressure and flowrate being the same, even larger height-to-diameter ratios could be required in case of a treatment to obtain a hydrocarbon gas that are suitable for particular subsequent process conditions, as in the case of the gas to be used for olefins production, in which $H_2S$ concentration higher than 1 ppm cannot normally be tolerated.

Furthermore, GB 2111852 does not specifically relate to sweetening/dehydration processes of hydrocarbon gases. It relates to processes where a single operation is carried out, in which a treatment liquid, for example a sweetening liquid, is fed according to a parallel arrangement. In an embodiment, a sweetening/regeneration process is carried out in side-by-side chambers, which may lead to important problems due to unwanted heat exchange and to unfavourable temperature profiles, since the sweetening temperature of processes is normally quite lower than the temperature at which the corresponding absorption liquid is regenerated, as in the case of amines.

Furthermore, the gas and liquid passageway according to the above-mentioned document, as shown in the drawings, should be made with ducts arranged within the shell, which can disturb the gas and liquid flow and cause a loss of efficiency of the apparatus.

FR 2 776 206 describes an air distillation apparatus in which distillation towers comprise coaxial or sector-shaped portions, and are connected to each other. However, the operating pressure and temperature differences at which the portions operate are limited.

U.S. Pat. No. 5,800,788 describes an $SO_3$ into $H_2SO_4$ absorption tower that is internally parted into a plurality of sections, in particular into three sections. Even in this case, the different sections work at substantially the same operating conditions, in particular the operating pressures are close to atmospheric pressure, while the operating temperature are substantially set between 60 and 80° C.

WO 98/32523 describes a gas scrubber that is internally parted into a plurality of chambers, in particular into two chambers. However, all the chambers operate at a substantially atmospheric pressure. The possible temperature differences between the chambers do not give origin to any particular force acting on the inner partition wall, since the latter can freely elongate towards its own upper end.

U.S. Pat. No. 4,198,387 describes a method and an apparatus for selectively removing $H_2S$ from a $CO_2$-containing gas whose flowrate may be adjusted. The use is provided of a plurality of conventional absorption towers, in particular of two towers, which operate in parallel, where each tower has respective serially connected absorption volumes. This device cannot solve the problem of reducing the surface extension, and requires high installation costs.

SUMMARY OF THE INVENTION

It is therefore a feature of the present invention to provide a method and an apparatus for sweetening and/or dehydrating a variable flowrate hydrocarbon gas stream, which allow maintaining the separation efficiency at a determined level within the whole flowrate range, in particular if a progressive flowrate reduction takes place.

It is a particular feature of the invention to provide such a method and apparatus for treating a natural gas, or a similar gas, as it is extracted from a well, maintaining the sweetening and/or dehydration efficiency throughout the whole useful life of the well.

In another aspect, it is a feature of the invention to provide such an apparatus that tolerates important flowrate changes, which allows reducing the size of the treatment units, with respect to prior art solutions.

These and other objects are achieved by a method for removing a component from a hydrocarbon gas, in particular from a gas extracted from a well or from a gasfield or an oilfield, said component changing from an initial concentration to a treated gas concentration, the method comprising the steps of:

prearranging a vertical elongated container vertical comprising at least one substantially vertical inner partition wall arranged within the vertical elongated container vertical, the at least one inner partition wall defining at least two treatment chambers within the container, each of the at least two treatment chambers having:
  a respective first inlet port;
  a respective second inlet port;
  a respective first outlet port;
  a respective second outlet port,
the first inlet port and the second outlet port arranged at an upper end of each treatment chamber, the first outlet port and the second inlet port arranged at a lower end each treatment chamber;

feeding a treatment liquid into at least one of the at least two treatment chambers through the respective first inlet port and extracting the treatment liquid as a used treatment liquid through the respective first outlet port of the at least one of the at least two treatment chambers;

feeding the hydrocarbon gas into at least one of the at least two treatment chambers through the respective second inlet port and extracting the hydrocarbon gas as a treated gas through the respective second outlet port of the at least one of the at least two treatment chambers, wherein in the at least one of the at least two treatment chambers the treatment liquid comes into contact with the hydrocarbon gas, in order to receive the component from the hydrocarbon gas, the hydrocarbon gas turned into a treated gas in which the component has the treated gas concentration, selecting a treatment mode from the group consisting of:
  a series-mode, wherein the hydrocarbon gas flows along a first and then along a second treatment chamber of the at least two treatment chambers, and the treated gas is extracted only from the second treatment chamber;
  a parallel-mode, wherein the hydrocarbon gas is directly fed into the first treatment chamber and into the second treatment chamber, and portions of the treated gas are extracted both from the first and from the second treatment chamber;
  an exclusion-mode, wherein the treated gas is fed/extracted to/from a single treatment chamber selected among the first treatment chamber and the second treatment chamber, wherein the component to be removed is selected from the group consisting of:
  an acid component, for example $H_2S$ and $CO_2$;
  water, i.e. a moisture content,
wherein a step is provided of compensating a mechanical deformation of the inner partition wall, said mechanical deformation due to a process condition difference between the first chamber and the second chamber, in particular a mechanical deformation due to a temperature and/or a pressure difference between the first chamber and the second chamber.

Advantageously, said step of compensating said mechanical stress due to a temperature difference between said first chamber and said second chamber comprises prearranging an inner partition wall that comprises a movable element that has an own edge end portion fixed within a convex bottom portion of said tower, and a guide means is provided for guiding a longitudinal slide movement of said movable element.

Said guide means for guiding a longitudinal slide movement may comprises at least one longitudinal flat connection member that is longitudinally connected within said shell of said tower.

Said movable element and said longitudinal flat connection member may respectively comprise a first plurality of holes and a second plurality of holes arranged along respective own lateral edges, according to a same sequence of centre hole distances, in order to form couples of corresponding holes of said movable element and of said flat connection member wherein each hole of said first plurality of holes faces one corresponding hole of said second plurality of holes during a slide movement of said movable element with respect to said flat connection member, wherein at least one hole of each of said couples of corresponding holes is slotted along the longitudinal direction of the tower.

Advantageously, said slotted holes have a slot length that increases along said movable element and/or along said flat connection member, said movable element and/or said flat connection member arranged such that said slot length increases moving away from the fastened edge portion.

Advantageously, said inner partition wall has an expansion compensation element comprising a deformable portion of said inner partition wall.

Said step of compensating said mechanical stress due to a pressure difference between said first chamber and said second chamber may comprise prearranging said inner partition wall according to two reciprocally parallel flat elements, in particular said inner partition wall is a double wall connected to the container, in particular, by means of welded joints.

In order to allow making welded joints in the space between the two flat elements, each plane element may comprise a flat connection member that is internally connected to the shell by a fillet welded joint, and a portion which is connected to the respective flat connection member by a full penetration butt welded joint.

Preferably, said step of prearranging said inner partition wall according to two parallel flat elements may comprise placing transversal stiffening elements therebetween.

Preferably, said step of prearranging of said inner partition wall may provide two parallel flat elements fluid-tightly arranged with said container, such that an overpressure can be created therebetween.

Said transversal stiffening elements may be perforated in order to allow a hydraulic continuity of the space between said planes parallel to each other.

The inner partition wall consisting of two parallel flat elements may comprise said parallel flat elements made in the form of a movable element that has an own edge end portion fixed within a convex bottom portion of said tower, and a guide means is provided for guiding the longitudinal slide movement of said movable element.

Advantageously, the selection of the series-mode and/or the exclusion-mode is carried out when the flowrate of the hydrocarbon gas to be treated decreases below a predetermined first flowrate threshold value, i.e. below a minimum flowrate threshold, and/or the selection of the parallel-mode is carried out when the flowrate of the hydrocarbon gas to be treated rises above a predetermined second flowrate threshold value, i.e. of a maximum flowrate threshold.

This way, it is possible to preserve a high treatment efficiency in each treatment chamber, or in any case it is possible to preserve an acceptable treatment efficiency. In fact, it is possible to maintain a flowrate enough high from ensure a mass optimal or at least an acceptable exchange coefficient, according to the features of the liquid-gas contact system. This is particularly relevant if random or structured packing are used. As already explained, packing systems are preferred in off-shore and floating installations.

For example, in the case of a hydrocarbon gas extracted from a well, a maximum flowrate of the gas to be treated decreases during the operation life of the well. At the beginning, when the flowrate is higher, a parallel feed mode of the sweetening and/or dehydration chambers is preferred. When the flowrate decreases below a predetermined value, it is possible to switch from the parallel feed mode to a series and/or exclusion feed mode.

In particular, it is possible to use a treatment unit comprising a vertical container that has only a pair of treatment sweetening and/or dehydration chambers, in a parallel feed mode, wherein Both chambers are directly fed with the gas to be treated, and then to switch to a series-mode or to an exclusion-mode, in which the two treatment chambers are serially fed with the gas to be treated, or only one the two units is supplied with the hydrocarbon gas, respectively.

An inner partition wall of the above described type may resist the specific forces it receives when some of the above treatment modes are operated.

In fact, in the parallel-mode, substantially the same operating pressure and the same temperature distribution is established within the two chambers. On the contrary, in the series-mode operation, the pressure of the first chamber, into which the gas is directly fed, is higher than the pressure within the second chamber, into which the gas is fed after it has left the first chamber. This effect is caused by and is responsive to the pressure drop of the gas in the two chambers. As a consequence, the longitudinal wall, in particular a flat wall, is likely to warp, by forming a convexity towards the second chamber. Such operating pressure difference is even higher in case of a treatment mode in which one of the two longitudinal chambers is excluded, and in which the chamber that is excluded from operation can be at a remarkably lower pressure, even at atmospheric pressure. This may occur, in particular, during maintenance. The same situation may take place in case of problem of the switch means for switching from an operation mode to another one.

In order to resist to the forces that arise from the pressure difference, a simple inner longitudinal flat partition wall should be very thick. In particular, with a pressure difference of only about 1 bar, wall thicknesses of about 30 mm may be necessary, which requires an important amount of material and causes an increase of the weight of the tower. Furthermore, this thickness would be remarkably higher than the thicknesses of the other shell portions of the tower, i.e. the cylindrical shell and the bottoms, which are advantageously connected to the wall by welded joints. This requires expensive heat treatments of annealing of the apparatus, once this has been assembled.

The pressure differences between the two chambers contained within the tower are particularly important in the case towers containing a random packing, which causes high pressure drop, but is cheaper than other exchange means. Moreover, a random packing is advantageous if the treatment liquid is likely to dirt, as in the case of monoethanolamine used as a sweetening liquid, or as in the case of a degradable liquid.

Therefore, an inner partition wall such as the above-described one allows using a random packing, which reduces the packing costs, without excessively complicating the construction to take into account the pressure drop.

The pressure differences between the two chambers contained within the tower are particularly important also in case of plate towers, where advanced trays are used, for example advanced trays available from Sulzer. These trays comprises a means for creating vortexes in the liquid head formed above them, in order to increase the mass exchange coefficient. Therefore, an inner partition wall such as the above-described one allows using such high exchange efficiency trays as a fluid dynamically equivalent solution, without excessively complicating the construction to take into account the pressure drop.

Furthermore, in the series treatment mode, differences of the process temperature profiles may occur between the first chamber and the second chamber. These differences are due to the thermal effects of the absorption, and in particular to possible thermal effects associated with chemical reactions between the acid substances that are adsorbed and the absorption liquid. In particular, these effects are particularly significant if the sweetening is carried out with an amine as the sweetening liquid. The temperature difference creates a mechanical stress substantially at each height of the wall, in addition to the one which is due to the pressure difference between the two chambers. The thermal stress causes the inner partition wall to bend as well, thus creating a convexity towards the second chamber. Furthermore, the higher the tower, the stronger is this effect, therefore the richer the gas in acid components, in particular hydrogen sulfide, the stronger is this effect. Therefore, an inner partition wall, such as the above-described one, allows performing sweetening, but also dehydration treatments, by a series treatment mode, in two longitudinal chambers contained within a tower, in particular in case of a particularly acid gas, without excessively complicating the construction in order take into account the temperature differences.

In the case of a sweetening and/or dehydration industrial unit for a hydrocarbon gas, such as a refinery or a petrochemical plants gas stream, a container may be arranged with a number of partition walls and, therefore, with a number of treatment chambers that depends upon the flowrate values of the gas to be treated, which are expected responsive to different rate conditions of the plant.

Both an even and an odd treating chambers number falls within the scope of the invention. Also a selection of a treatment mode falls within the scope of the invention in which more than two treatment chambers are used. For example, three unit arranged in parallel may be commuted into a series mode in a common step of commutation, according to the gas flowrate change that is expected or scheduled.

For example, the method may be used for treating a natural gas extracted from a gasfield or from an oilfield. The method may be advantageously used also for treating a refinery gas fraction, for example a gas from crude oil atmospheric distillation, or a gas coming from conversion plants such as desulphurization, thermal or catalytic cracking, visbreaking, coking plants. The method may be advantageously used also for treating a hydrocarbon gas of a petrochemical plant. The method may be advantageously used also for treating a hydrocarbon gas of a chemical plant. The method may be advantageously used also for treating a coke oven gas. The method may be advantageously used also for treating a hydrocarbon gas produced by a degradation and/or fermentation process, for example a biogas. The method may be advantageously used also for treating a fuel gas to be burnt in torch. Briefly, the method may be advantageously used for treating hydrocarbon gas that require in any case a treatment for removing both acid compounds, such as $CO_2$ and $H_2S$, and moisture. In this case, the gas may be fed separately in only sweetening and/or dehydration chambers. In particular, in the case of a sweetening treatment, the component to be removed is an acid compound, and the treatment liquid is a sweetening liquid, i.e. a liquid containing a substance adapted to create a physical-chemical bond, or just a physical bond with the acid compound, in order to assist the absorption of the compound into the solution and therefore to assist the removal of the compound from the gas stream.

Preferably, this substance adapted to combine with the acid compound is an organic base, for example a primary, a secondary or a tertiary amine. In particular, the amine is an alkanolamine such as monoethanolamine, diethanolamine, methyldiethanolamine, or a combination thereof. In this case, the sweetening liquid is advantageously an aqueous solution of the organic base. In alternative, or in addition, the sweetening liquid may be a solution, typically an aqueous solution, of an inorganic base, in particular it may be a sodium hydroxide solution.

In particular, the component to be removed is moisture, i.e. water, and the treatment liquid is a dehydration liquid, i.e. a liquid containing a hygroscopic substance. This is the case of a dehydration treatment. In particular, the hygroscopic substance is a glycol, such as triethylene glycol. Advantageously, the dehydration liquid is a high purity degree glycol. In particular, the dehydration liquid is a glycol of purity degree higher than the 99%, more in particular, a glycol of purity degree higher than the 99.9%.

Advantageously, a step is provided of regenerating the used treatment liquid, wherein at least one part of the used treatment liquid is changed into a regenerated treatment liquid, which is preferably added to a predetermined amount of fresh make-up treatment liquid to form the treatment liquid that is fed to the treatment chamber. Since the sweetening or dehydration liquid of two parallel treatments is the same, for example DEA as a sweetening liquid and/or TEG as a dehydration liquid, it could be split according to the treatment features of each gas. Therefore, the Amine and/or TEG regeneration device could be a same equipment.

If alkanolamine solutions are used as a possible sweetening liquid, the regeneration step is preferably carried out within a distillation tower, after a step of expanding the used sweetening liquid, as this is extracted from the sweetening chamber.

Advantageously, the used sweetening liquid, after the expansion step, undergoes a step of oil and/or fuel fractions recovery.

If a glycol is used as a possible dehydration liquid, the regeneration step is preferably carried out by distillation. In particular, the regeneration step may be carried out by a single evaporation-condensation step.

The above mentioned objects, and other, are also achieved by an apparatus for removing a component from a hydrocarbon gas, in particular from a gas extracted from a gasfield, the apparatus comprising:

a vertical elongated container comprising at least one substantially vertical inner partition wall arranged within the vertical elongated container, the at least one inner partition wall defining at least two treatment chambers within the container, each of the at least two treatment chambers having:
  a respective first inlet port;
  a respective second inlet port;
  a respective first outlet port;
  a respective second outlet port, the first inlet port and the second outlet port arranged at an upper end of each treatment chamber, the first outlet port and the second inlet port arranged at a lower end each treatment chamber;
  a feeding means for feeding a treatment liquid into at least one of the at least two treatment chambers through the respective first inlet port, and a liquid extraction means for extracting the treatment liquid as a used treatment liquid through the respective first outlet port of the at least one of the at least two treatment chambers, wherein the feeding means of the treatment liquid is adapted to feed a liquid selected from the group consisting of:
    a sweetening liquid, i.e. a liquid adapted to receive an acid compound present in the hydrocarbon gas to be treated;
    a dehydration liquid, i.e. a liquid adapted to receive moisture present in the hydrocarbon gas to be treated;
  a feeding means of the hydrocarbon gas into at least one of the at least two treatment chambers through the respective second inlet port, and a gas extraction means for extracting the hydrocarbon gas as a treated gas through the respective second outlet port of the at least one of the at least two treatment chambers, so that in the at least one of the at least two treatment chambers the treatment liquid comes into contact with the hydrocarbon gas and receives the component from the hydrocarbon gas, and that the hydrocarbon gas is changed into a treated gas in which the component has the treated gas concentration, where they are, furthermore, provided with selective convey means for carrying out a treatment mode of the hydrocarbon gas selected from the group consisting of:
    a series-mode, wherein the hydrocarbon gas flows along a first treatment chamber and then a second treatment chamber of the at least two treatment chambers, and the treated gas is extracted only from the second treatment chamber;
    a parallel-mode, wherein the hydrocarbon gas is directly fed into the first treatment chamber and into the second treatment chamber, and portions of treated gas are extracted from both first and second treatment chamber;
    an exclusion-mode, wherein the treated gas is fed/extracted to/from a single treatment chamber selected among the first treatment chamber and the second treatment chamber.

In an exemplary embodiment, the inner partition wall comprises a movable element that has an own edge end portion fixed within a convex bottom portion of said tower, and a guide means is provided for guiding the longitudinal slide movement of the movable element. This allows a thermal expansion of the movable element, such that the stress due to the temperature difference the two chambers 151, 152, which takes place, in particular, if the gas is particularly rich in such acid components as $H_2S$ and $CO_2$.

For example, the guide means to the sliding longitudinal comprise at least one longitudinal flat connection member that is longitudinally connected to the shell of the tower. Preferably, the movable element and the longitudinal flat connection member comprise respectively a first plurality of holes and a second plurality of holes arranged along respective own lateral edges, according to a same sequence of centre hole distances, in order to form couples of corresponding holes of the movable element and of the flat connection member wherein a hole of the first plurality of holes faces a corresponding hole of the second plurality of holes during a slide movement of the movable element with respect to the flat connection member, wherein at least one hole of each couples of corresponding holes is slotted along a longitudinal direction. The flat connection member has therefore the function of a guide for the movable element of the inner partition wall, and forms along with this movable element a sealing means between the first and the second chamber.

Advantageously, the slotted holes have a slot length that increases along the movable element and/or along the flat connection member, the movable element and/or the flat connection member arranged such that the slot length increases moving away from the fastened edge portion.

In another exemplary embodiment, the inner partition wall has an expansion compensation element that comprises a deformable portion of the inner partition wall.

In an exemplary embodiment, the selective convey means comprise a first and a second shut-off two-way valve, which are arranged along respective first and second outlet duct of the first treatment chamber, both in communication with the second outlet port of the first treatment chamber, wherein the first outlet duct is connected to the second outlet port of the second chamber, and the second of such outlet ducts is connected to the second inlet port of the second chamber. Accordingly,
  with the first valve closed and with the second valve open, the parallel treatment mode is enabled,
  with the first valve open and with the second valve closed the series treatment mode is enabled, and
  with both first and the second valve closed, the exclusion treatment mode is enabled.

In another exemplary embodiment, the selective convey means comprises:
  a shut-off two-way valve that has a way in communication with the second outlet port of the first treatment chamber;
  a three-way diverting valve that has an inlet way in communication with the other way of the shut-off valve, and a first and a second outlet way connected to the second outlet port of the second chamber and to the second inlet port of the second chamber, respectively;
Accordingly,
  with the shut-off valve open and with the diverting valve open to the first outlet way and closed to the second outlet way, the parallel treatment mode is enabled,
  with the shut-off valve open and with the diverting valve closed to the first outlet way and open to the second outlet way, the series treatment mode is enabled, and
  with the shut-off valve closed and with the diverting valve in any of the two above positions, the exclusion treatment mode is enabled.
wherein an inner longitudinal partition wall is arranged inside the vertical elongated container, the inner longitudinal partition wall defining the first chamber and the second chamber in the vertical elongated container, and the apparatus comprises a compensation means of the differential expansion that is caused by a temperature difference between the first chamber and the second chamber.

The apparatus may comprise automatic selection means that are associated with the selective convey means, the automatic selection means comprising:
  a flowrate detection means for detecting the flowrate of the hydrocarbon gas to be treated, the flowrate detection means arranged to produce a flowrate signal;

an actuating means arranged to receive the flowrate signal and to actuate:

the series treatment mode or the exclusion treatment mode, when the flowrate signal indicates that the flowrate of the hydrocarbon gas to be treated decreases below a predetermined first flowrate threshold value;

the parallel treatment mode, when the flowrate signal indicates that the flowrate of the hydrocarbon gas to be treated rises above a predetermined second flowrate threshold value.

The treatment chambers have respective cross sections with respect to a main direction of the vertical elongated container. Advantageously, the ratio between the cross sectional area of another desired treatment chamber is set between 0.91 and 1.05. In particular, this ratio is close to 1.

Advantageously, the apparatus comprises a liquid distribution means for performing a distribution of the treatment liquid, selected from the group consisting of:

a parallel distribution, wherein the treatment liquid is split into two streams that are fed to respective treatment chambers;

a series distribution, wherein the treatment liquid is fed to one chamber of the two treatment chambers, and the exhausted treatment liquid is fed as treatment liquid at the other chamber of the two treatment chambers.

In particular this wall defines only two treatment chambers in the container.

In an exemplary embodiment, the apparatus comprises a first container that is parted into a plurality of sweetening chambers, a second container that is parted into a plurality of dehydration chambers, and a gas convey means for conveying the treated gas coming from at least one of the sweetening chambers into at least one of the dehydration chambers.

The treatment chambers may be, one independently from the other, plate or packing chambers. In the case of a packed chamber, the packing may be a random or structured packing. The plate towers allow a high flexibility, with a maximum to minimum capacity ratio of about 10/1, against 5÷6/1 of the structured packed towers.

Advantageously, the apparatus comprises a regeneration device the used treatment liquid, said apparatus arranged to transform at least one part of the used treatment liquid into a regenerated treatment liquid. In this case the apparatus advantageously comprises a means for mixing the regenerated treatment liquid with a predetermined amount of fresh make-up treatment liquid, in order to form the treatment liquid.

In particular, the used i.e. exhausted sweetening liquid regeneration device, is configured to cause a scission of the complex compound that the amine forms with the hydrogen sulphide and/or with the carbon dioxide. In other words, the regeneration device is adapted to thermally desorb the acid compounds from the adsorption solution. This way, it is possible to transform the used sweetening liquid into a regenerated sweetening liquid, releasing the acid compound from the amine. Such device may comprise a regeneration tower equipped with an indirect heating means.

In particular, the regeneration device of the possible used dehydration liquid is adapted to carry out a step of heating and distilling the used dehydration liquid, in particular it is adapted to carry out a step of evaporation-condensation of the used dehydration liquid.

Preferably, a means is provided for expanding the used treatment liquid as this is extracted from the treatment chamber, in particular a rotatable expansion means.

Advantageously, a liquid compression means is provided for compressing the regenerated treatment liquid until it reaches an operating pressure of the treatment chamber. The liquid compression means may be associated to the rotatable expansion means of the used treatment liquid, in order to exploit the kinetic energy of the rotatable expansion means that is generated by the expansion of the used treatment liquid. The rotatable expansion means of the used treatment liquid may comprise a turbine, and the means for compressing the regenerated treatment liquid may comprise a pump that is mechanically operated by the turbine.

In particular, the means for expanding the used sweetening liquid is associated with a means for recovering an oily fraction and/or a fuel fraction from the used sweetening liquid.

BRIEF DESCRIPTION OF THE DRAWINGS

The invention will be now shown with the description of an exemplary embodiment thereof, exemplifying but not limitative, with reference to the attached drawings, in which like reference characters designate the same or similar parts, throughout the figures of which:

FIG. 2 is a diagrammatical longitudinal sectional view of an absorption tower according to the invention, equipped with an inner partition double wall;

FIG. 3 is a diagrammatical cross sectional view of the absorption tower of FIG. 2;

FIG. 4 is a diagrammatical cross sectional view of an exemplary embodiment of the tower of FIGS. 2 and 3;

FIG. 5 is a cross sectional view of a detail of the tower of FIG. 3;

FIGS. 6 and 7 are further views of the detail of the tower of FIG. 3, in which an alternative mode is shown for fastening the double wall;

FIG. 8 is a diagrammatical cross sectional view of an exemplary embodiment of the tower of FIGS. 2 and 3, in which a means is provided for pressurizing the space inside the double wall;

FIG. 9 is a diagrammatical longitudinal sectional view of an exemplary embodiment of the tower of FIGS. 2 and 3, in which the means for pressurizing the space in the double wall comprises a process fluid passageway from the first to the second chamber of the tower;

FIGS. 10 and 11 are diagrammatical cross sectional views of further exemplary embodiments of the tower of FIG. 2, wherein a stiffening means is provided in the space between the double wall;

FIGS. 12 and 13 are views of a detail of the tower of FIG. 11, in which an alternative mode for fastening the double wall is shown;

FIGS. 14 and 15 are perspective cross sectional views of the towers of FIGS. 10 and 11, respectively;

FIG. 16 is a perspective cross sectional view of the tower of FIG. 14;

FIG. 17 is a diagrammatical cross sectional view of an exemplary embodiment of the tower of FIG. 12;

FIG. 18 shows a cross sectional view of a tower equipped with a double inner partition wall that defines a hollow space, in which stiffening elements are provided.

FIGS. 19 to 22 are partial longitudinal cross sectional views of a tower according to an exemplary embodiment of the invention, with a different mode of making reinforce element within the double wall;

FIGS. 23 and 24 are diagrammatical views of a longitudinal cross section of an absorption tower according to the invention, with an inner partition double wall in which a fixing means is provided like in the tower of FIGS. 12 and 13;

FIG. 25 is a cross sectional view of a detail of the tower of FIGS. 23 and 24;

FIGS. 26 and 27 are longitudinal cross sectional views of a detail of the tower of FIG. 25;

FIGS. 35 to 40 show diagrammatical views of a sweetening section towers or dehydration;

DESCRIPTION OF PREFERRED EXEMPLARY EMBODIMENTS

Figure 1:
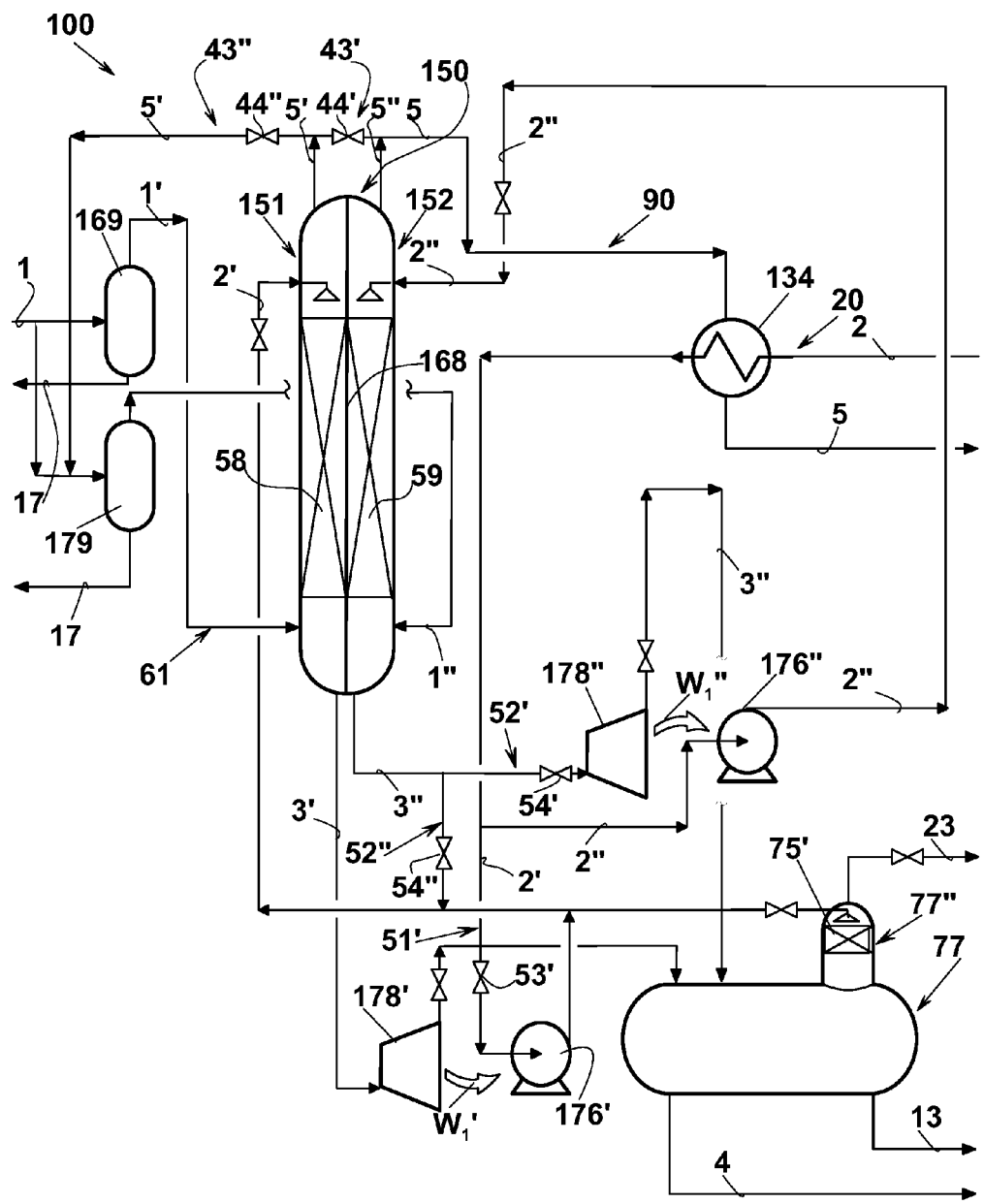
FIG. 1 represents diagrammatically an apparatus for sweetening an acid natural gas according to an exemplary embodiment of the invention.

With reference to FIG. 1, a method and an apparatus 100 are described for a treatment of removing a component from a hydrocarbon gas stream, in particular a sweetening treatment of an acid natural gas. A vertical sweetening tower 150 comprises an inner partition wall 168 that extends longitudinally within tower 150. Inner partition wall 168 defines a first sweetening chamber 151 and a second sweetening chamber 152 within tower 150, which are separated by inner partition wall 168.

At least one part 1' of acid gas 1, as this is extracted from a well or from a gasfield, is subjected to a gravitational solid dust and liquid matter removal in a cyclone separator 169, or in an equivalent equipment. Acid gas 1 is then fed into a first sweetening chamber 151 through a second inlet port 172. Acid gas 1 turns into an at least partially sweetened gas 5' in first sweetening chamber 151, from which it is extracted through a second outlet port 174. First sweetening chamber 151 is also supplied with at least one part 2' of a sweetening liquid 2, through a first inlet port 171. The sweetening liquid may be an aqueous solution of a substance suitable for chemically or only physically combining with the acid compounds of the gas, for example it may be a primary, a secondary or a tertiary amine. In particular, the amine is selected among monoethanolamine, diethanolamine, methyldiethanolamine, or a combination thereof. Sweetening liquid 2' flows down through first sweetening chamber 151, from which it is extracted as a portion of used or exhausted sweetening liquid 3' through a first outlet port 172.

Figure 32:
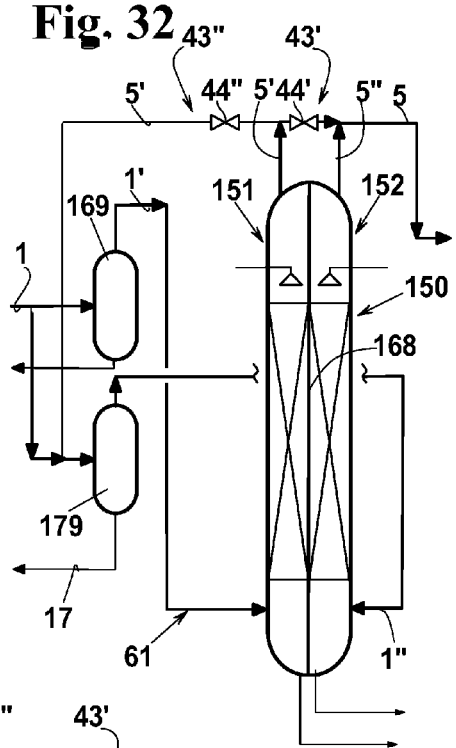

The method provides a first "parallel" treatment mode of first and of second sweetening chambers 151,152. The piping engaged by the gas in the parallel-mode are shown by bold lines in FIG. 32. In the parallel treatment mode to each other, also a second part 1" of acid gas 1, as extracted from a well or from a gasfield, is subjected to a gravitational solid dust and liquid matter removal in a cyclone separator 179, or in an equivalent equipment. At least partially sweetened gas 5' is then fed to second sweetening chamber 152 through a second inlet port 182. In sweetening chamber 152, at least partially sweetened gas 5' is changed into sweetened treated gas 5", from which is extracted through a second outlet port 184. Moreover, second sweetening chamber 152 is also supplied with a second part 2" of sweetening liquid 2 through a first inlet port 181. Sweetening liquid 2" flows down through second sweetening chamber 152, and turns into a used or exhausted sweetening liquid 3", which is extracted from sweetening chamber 152 through first outlet port 182.

Figure 33:
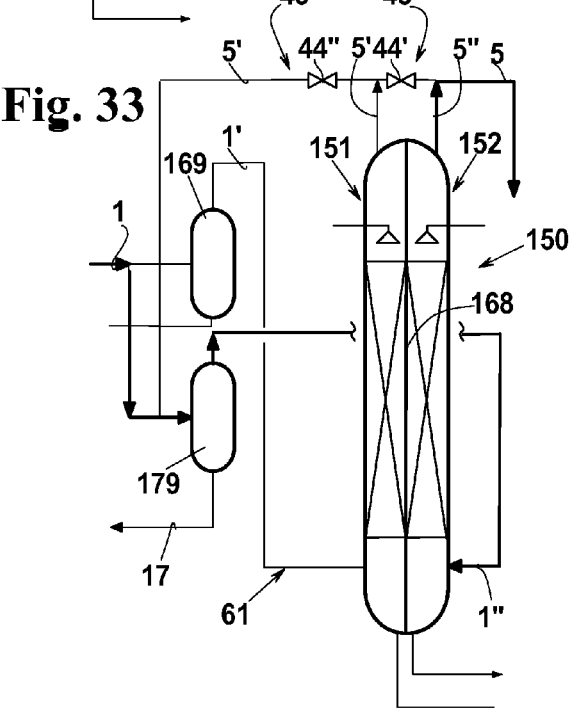

In addition to the first treatment mode, or parallel-mode, the method provides a second operation mode or series-mode of first sweetening chamber 151 and of second sweetening chamber 152. The piping engaged by the gas in the series-mode is shown by bold lines in FIG. 33. In the series treatment mode, partially sweetened gas 5' may undergo a further gravitational solid dust and liquid matter removal in a cyclone separator 179 (FIG. 1), or in an equivalent equipment, and is then fed to second sweetening chamber 152 through second inlet port 182. In second sweetening chamber 152, partially sweetened gas 5' turns into sweetened gas 5", which is extracted through second outlet port 184. Furthermore, second sweetening chamber 152 is also supplied by a second part 2" of sweetening liquid 2, through first inlet port 181, also. Sweetening liquid 2" flows down through second sweetening chamber 152 and is changed into a used or exhausted sweetening liquid 3", which is extracted through first outlet port 182.

In an exemplary embodiment of the second operation mode, in alternative to series operation of two sweetening chambers 151,152 an exclusion operation mode is provided of one of two sweetening chambers 151,152. The piping engaged by the gas in this operation mode is shown by bold lines in FIG. 34. In the exclusion treatment mode, only first sweetening chamber 151, or second sweetening chamber 152, as shown, works, i.e. only one of two sweetening chambers 151,152 of tower 150 is traveled along by acid gas 1', which may coincide with the whole flowrate of acid gas 1 as extracted from a well, and is traveled along by sweetening liquid 2'.

Furthermore, the method provides a step of switching from a parallel-mode to a series-mode or to an exclusion-mode of first or second sweetening tower 151,152, and/or a step of reverse switching, from an exclusion-mode to a parallel-mode. The step of switching from a parallel-mode to an exclusion-mode may depend upon a step of determining the conditions of acid gas 1 to be treated. In particular, the step of switching from the parallel-mode to the series-mode or to the exclusion-mode may be carried out if the flowrate of acid gas 1 to be treated decreases below a predetermined minimum threshold value, which may occur during the operation life of a well or of a gasfield from which acid gas 1 is extracted, and/or the step of switching from the series-mode or from the exclusion-mode to the parallel-mode may be carried out if the flowrate of acid gas 1 to be treated rises above a predetermined maximum threshold value, which may or may not coincide with the minimum threshold value.

In the exemplary embodiment of sweetening apparatus 100 of FIG. 1, a selective convey means is provided to carry out the step of switching from/to a parallel-mode to/from a series-mode or to/from an exclusion-mode. In the exemplary embodiment shown, the selective convey means comprise a couple of two-way shut-off valves 44' and 44" arranged along outlet ducts 43' and 43". Valves 44' and 44" are in communication with second outlet port 174 of first treatment chamber 151. Duct 43' is connected to second outlet port 184 of second chamber 152, whereas duct 43" is connected to second inlet port 182 of second chamber 152.

With valve 44' closed and valve 44" open, the streams of partially sweetened and sweetened gas 5',5" are kept separate. It is possible to join the streams of sweetened gas 5' and 5" in the stream of sweetened gas 5, which corresponds to actuate the above described parallel-mode.

With valve 44' open and valve 44" closed, the series-mode can be actuated, while with both valves 44', 44" closed the stream 5' (or 5") can be conveyed as the stream of sweetened gas 5, thus actuating the exclusion-mode of first sweetening chamber 151 if second chamber 152, or first chamber 151, is not fed.

In an exemplary embodiment, apparatus 100 comprises an automatic selection means for automatically changing the treatment mode of apparatus 100 according to the flowrate value of gas 1 to be treated, choosing the parallel-mode, the series-mode or the exclusion-mode as the new operation mode. The selection means may comprise a flowrate sensor, not shown, which may be mounted on the duct 61, and which is arranged to produce a flowrate signal, as well as a control means arranged to receive the flowrate signal and to compare it with at least one predetermined threshold values. Moreover, the control means is arranged to operate an actuator means of the selective convey means, for example the actuators of valves 44' and 44" or of valves 48 and 49, in order to actuating the series-mode or the exclusion-mode, when the flowrate signal indicates that the flowrate of acid gas 1 has decreased below a predetermined threshold value, and/or in order to actuating the parallel-mode, when the flowrate signal indicates that the flowrate of acid gas 1 has risen above another predetermined threshold value.

The method provides steps of treating, i.e. of distributing and of regenerating and/or discharging exhausted sweetening liquid 3' and/or 3" coming from first and/or from second sweetening chamber 151 and/or 152. In particular, a "parallel" distribution is provided, in which the streams of sweetening liquid 2' and 2" are two portions of the stream of sweetening liquid coming from a storage or from a regeneration unit, respectively, and supply sweetening chambers 151 and 152, respectively, through pumps 176' and 176". The streams of both above-mentioned exhausted sweetening liquid 3' and exhausted liquid 3" are expanded in a rotatable expansion means, specifically in a respective turbine 178' and 178", and reach a separation chamber 77 of the type already described, in which an oily fraction 4 is separated from s water fraction 13, which contains the spent alkaline substance, as discussed when describing FIG. 1. Pumps 176' and 176" may be associated with turbines 178' and 178", respectively, in order to use kinetic energy $W_1', W_1"$ of the impeller of two turbines 178' and 178", respectively.

In alternative, a "series" distribution of the sweetening liquid is provided in which, in the exemplary embodiment of FIG. 1, the stream of sweetening liquid 2 is supplied to second sweetening chamber 152 as stream 2", and the stream of exhausted sweetening liquid 3" is supplied to first sweetening chamber 151 as stream 2', possibly by means of an impelling pump, not shown. In an exemplary embodiment, not shown, the stream of sweetening liquid 2 may be supplied to first sweetening chamber 151, and the stream of exhausted sweetening liquid 3' of the first sweetening chamber is supplied to second sweetening chamber 152 as stream 2".

The method may provide a step of switching from the parallel distribution of sweetening liquid 3', 3" to the series distribution, and/or vice-versa. In particular, the step of switching from the series distribution to the parallel distribution, and vice-versa, may be carried out substantially at the same time of the step of switching from the parallel sweetening mode of acid gas 1 to the series treatment mode, and vice-versa, as described above.

In the exemplary embodiment of sweetening apparatus 100 shown in FIG. 1, a switch means is provided for actuating the step of switching from/to a parallel distribution of the sweetening liquid to/from a series distribution, said switch means comprising, for example, a shut-off two-way valve 53' arranged along a feed line 51' of sweetening liquid 3' into first sweetening chamber 151, and a couple of shut-off two-way valves 54', 54" arranged along outlet lines 52', 52" of second sweetening chamber 152. With valves 53' and 54' open and with valve 54" closed, the feed streams of sweetening liquid 2' and 2" are kept separate as well as the streams of exhausted sweetening liquid 3' and 3", and it is possible to actuate the parallel distribution. In this case, the streams of exhausted sweetening liquid 3' and 3" are joined in treatment chamber 77 after expanding in respective turbine 178' and 178". In alternative, with valves 53' and 54' closed and with valve 54" open, the stream of exhausted sweetening liquid 3" coming from second sweetening chamber 152 forms the stream of sweetening liquid 2' that is supplied to first sweetening chamber 151, possibly by means of an impelling pump, not shown, thus actuating the series distribution. The stream of exhausted sweetening liquid 3' expands in turbine 178' and reaches treatment chamber 77.

After leaving sweetening tower 150, sweetened gas 5 engages a duct 90, i.e. a convey means between sweetening chamber 152 and a following storage unit, or a convey means towards a further treatment unit, in particular a dehydration unit, an exemplary embodiment of which is described hereinafter. A heat exchanger may be arranged 134 along duct 90 for controlling the temperature of stream 2 of sweetening liquid coming from a storage or from a regeneration unit, such that the inlet temperature of stream 2 is a few degrees higher than the temperature of sweetened gas 5.

Figure 41:
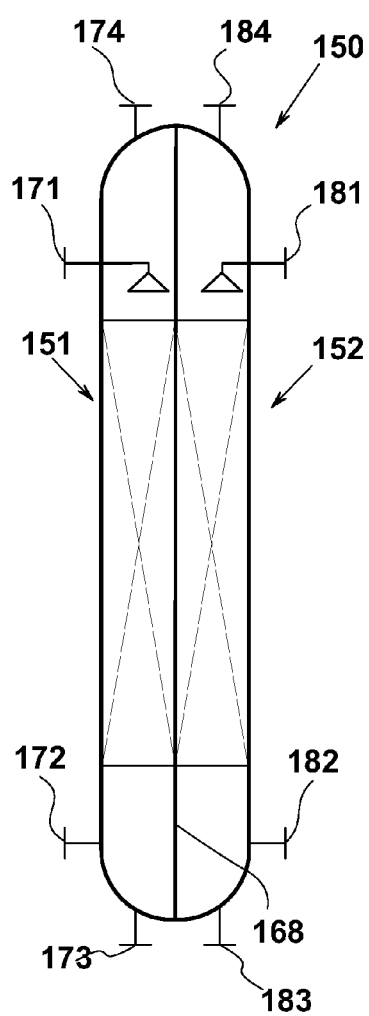
FIGS. 41 and 42 diagrammatically show two towers, respectively an absorption towers and a dehydration towers.
Figure 42:
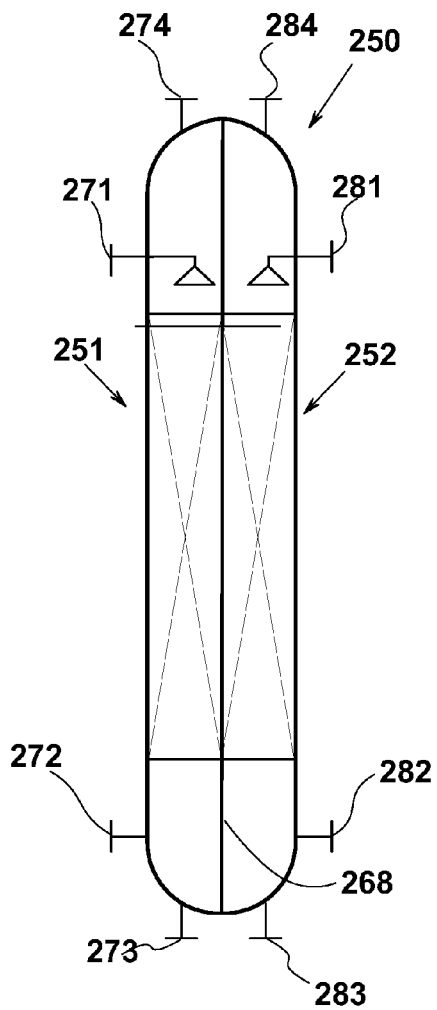

With reference to FIG. 2, a treatment tower is described, in particular a sweetening tower 150 comprising a container consisting of cylindrical shell 17 and of a couple of upper and lower bottoms 18,19, as well as an inner partition wall 168 that defines a first and a second treatment chamber in the container, in particular an absorption chamber 151,152. Also FIG. 41 relates to sweetening tower 150, and shows, in addition, the inlet and outlet ports of the sweetening chambers 151,152. First sweetening chamber 151 has a first and of a second inlet port 171 and 172 and a first and a second outlet port 173 and 174. First inlet port 171 and second outlet port 174 are arranged at the upper end portion of sweetening chamber 151, while first outlet port 173 and second inlet port 172 are arranged at the lower end of the vertical sweetening chamber 151.

Still with reference of FIG. 2, inner partition wall 168 comprises two flat elements 21,22 parallel to each other, in other words inner partition wall 168 is a double wall. In the cross sections of FIGS. 3-5 is shown a double inner partition wall that is connected to the container, in particular to shell 17 by means of welded joints 33, 33'. In order to allow making welded joints in the space between two flat elements 21,22, each plane element 21,22 comprises a flat connection member 31,32 that is internally connected to the shell by a fillet welded joint 17, and also comprises a portion 21',22' that is connected to the respective flat connection member 31,32 by a full penetration butt welded joint 34,34'. This kind of welded connection, as shown in FIG. 5, can be used for other edge portions as well, in particular for an edge portion that is diametrically opposite to inner partition wall 168. FIG. 4 shows a tower 150 comprising a double non-diametrical inner partition wall 168, which divides the container into two chambers that have different cross sections, one larger than the other.

With reference to FIGS. 6 and 7, a tower 150 is described according to an exemplary embodiment that comprises again two flat elements 21 and 22 movable with respect to shell 17 of tower 150, in particular, with respect to corresponding flat connection members 31,32 connected to the container, in particular and to shell 17, similarly to what is shown in FIG. 5. In the exemplary embodiment of FIGS. 6-7, inner partition wall 168 has an own edge end portion fixed within a convex bottom portion 18, 19 of the tower, for example by at least one welded joints 30 (FIG. 2). A guide means is also provided for guiding a longitudinal slide movement of wall 168, said guide means preferably comprising a couple of longitudinal flat connection members 31,32 that extend along the whole height of tower 150. Longitudinal flat connection members 31,32 may be connected to the tower, typically to shell 17, as described with reference to FIG. 5. Holes are made aligned proximate and parallel to the longer edges of the longitudinal wall. Similarly, holes are aligned proximate and parallel to the edge of each longitudinal flat connection member 31. The holes are at a mutual distance according to a same distance sequence, such that they can face each other during the slide movement of wall 168 with respect to flat members 31. In each couple of holes that face each other there is a slotted hole and a circular one, as described more in detail hereinafter (FIGS. 25-28). The holes are arranged to house respective rod elements 35, in particular screws stem portions. A nut 34 is arranged opposite to screw head 34', said nut engaging with the screw according to a predetermined locking force. A seal element 36 is arranged between longitudinal flat connection member 31 and wall 168, for example a Teflon® element, which ensures a fluid-tight connection between chamber 151 and chamber 152. Suitable sealing means may be also arranged at nut 34, as in Fig., or at screw head 34', which is located on the higher pressure side. This way, wall 168 is substantially free to deform as a consequence of thermal stresses.

In the exemplary embodiment of FIG. 7, seal element 36 is arranged nearer to the wall with respect to bolts 34'-34. This way, it is not necessary to provide a seal element under screw head 34' or under nut 34 to ensure a tight fluid-connection between chamber 151 and chamber 152.

FIG. 8 shows a cross sectional view of a tower 150 in which the two flat portions of double inner partition wall 168 define a hollow space 86, i.e. a space within inner partition wall 168 that is configured to receive a pressurized fluid, for example a gas or a pressurized liquid, through such feeding means as a nozzle or a flow section 14 for this pressurization fluid.

Independently from the presence of a means for feeding a pressurized fluid into the hollow space 86, double wall 168 may comprise stiffening elements within wall 168, which connect flat elements 21 and 22.

As shown in FIGS. 10 and 11, such stiffening elements may be of connection flat elements or central portions 23, which connect the flat elements or wings 21,22. For example, a single central portion 23 may be provided, or a plurality of parallel central portions 23, for example two parallel central portions 23. FIGS. 14 and 15 show, in cross sectioned perspective views, partition walls 168 of FIGS. 10 and 11. FIG. 16 relates to an exemplary embodiment of the inner partition wall of FIGS. 11 and 15, in which holes 25 are made along stiffening wings 23 to create a hydraulic or pneumatic continuity between the portions of hollow space 86 defined by wings 21,22 along with central portion or portions 23. Tower 150 of FIG. 14 may be equipped with a feeding means for feeding a pressurized fluid, advantageously, which is shown as a through hole 14 in FIG. 16.

With reference to FIG. 9, an exemplary embodiment of tower 150 is described in which hollow space 86, or a portion of the hollow space free from stiffening elements such as stiffening elements 23, forms a passageway for a process fluid from first chamber 151 to second chamber 152. The process fluid may be a gas that has been partially treated in first chamber 151 and that must be further treated in second chamber 152. In this case, flow sections 12, 13 are provided between hollow space 86 and first chamber 151 and second treatment chamber 152, respectively.

The double partition walls, which may be reinforced and/or may have pressurizable hydraulic/pneumatic continuity chambers 86 or fluid passageways 86 for, as shown in FIGS. 8-11 and 14-16, are connected to the container of tower 150, for example by welded joints. The double wall structure allows parting the moment of inertia that is needed to resist the forces due to a pressure difference between chambers 151 and 152 on two flat elements, such as two sheet portions, which makes it possible to use a lower thickness material to make a wall 168 of suitable mechanical resistance. The use of such semi-finished products as lower thickness metal sheets is an advantage as such, since the lower thickness sheets can be purchased more easily and can be connected more easily, in particular by welding them within tower 150. This reduces the cost of heat treatments of the tower after assembling it.

Reinforce members, or a process or non-process pressurization fluid, allow, furthermore, to use metal sheets of a thickness generally lower than the thickness a single plane element should have for the stability of a single-layer wall. This reduces the weight and then the costs, and other resource requirements, to make, transport and install tower 150.

In the exemplary embodiment of FIGS. 12 and 13, the double wall is of the type comprising stiffening central portions 23, in this case preferably at least two stiffening central portions 23, which connect flat elements 21, 22 of the wall. At least one of two flat elements 21, 22, in this case the plane element 21, is connected to a longitudinal flat fastening member 31, by one of the ways shown in FIGS. 6,7 for each plane element 21,22. In other words, flat elements 21,22, along with stiffening elements 23 or other connection elements, form a movable element of flat wall 168. In particular, FIG. 13 shows a connection method as shown in FIG. 7, in which a plurality of screws 35 ensures the connection of movable element 20 to flat connection member 31, by a stud connection comprising a screw-threaded, preferably gas-threaded hole made in the flat element 21, and by tightening the screws 34 against flat connection member 31. As in the case of the double walls of FIGS. 6 and 7, the solution of FIGS. 12 and 13 allows obtaining a suitable resistance against the forces due to a pressure difference between two chambers 151, 152, and at the same time allows a thermal expansion of the movable element, in order to reduce the forces due to a temperature difference between two chambers 151, 152.

Also FIG. 17 shows a double inner partition wall 168 which is similar to the wall of FIG. 12,13, and is equipped with a differential thermal expansion compensation, in a tower 150 wherein a plurality of couples of longitudinal flat fastening elements 31 is provided, which are arranged along parallel chords of the circular section of the container of tower 150, in order to change the position of movable element 20 of inner partition wall 168, within a predetermined encumbrance limit, without modifying movable element 20.

FIG. 18 shows a cross sectional view of a tower equipped with a double inner partition wall 168 formed in such a way to define a hollow space 86 in which stiffening elements 26 are arranged that have a circular cross section. As shown in FIGS. 19-22, these elements may be made from circular cross section bar that are connected, for instance, within at least one of two flat elements 168', 168", such elements of circular cross section bar portions may be arranged parallel to each other, in particular they may be orthogonal to the longitudinal axis of the tower (FIGS. 19, 21, 22) or may form any angle (FIG. 20) with the direction of this axis. Exemplary embodiments are shown in FIGS. 21 and 22, in which such circular cross section bar portions are arranged to form a space that has a pneumatic or hydraulic continuity, for example by arranging the circular cross section bar portions are arranged parallel to one another and are alternately arranged beside one edge portion and beside another edge portion of an plane element of inner partition wall 168. In this exemplary embodiment, the pneumatically or hydraulically continuous space may be equipped with a pressurization means for pressurizing the hollow space between flat elements 168' and 168" of inner partition wall 168. In particular, the pressurization means may comprise a flow section 14 or an inlet/outlet nozzle for a pressurized fluid, which may be a liquid or a gas, as shown in FIG. 22. In alternative, the pneumatically or hydraulically continuous space may form a passageway for a fluid flowing from the first to the second chamber, for example the gas partially treated in first chamber 151, in a series treatment mode, or the partially exhausted treatment liquid used for the treatment in the first or in the second chamber.

According to the exemplary embodiment of FIG. 23, inner partition wall 168 of tower 150 comprises a movable wall element 20 that is connected within a shell portions of tower 150 by an own edge portions 31', while the other edge portions are relatively free to move, which allows the expansion of inner partition wall 168. For instance, this edge portion may be connected to the shell portions by welded joints, or by any other suitable connection technique.

In the exemplary embodiment of FIGS. 25-27, the inner partition wall has an own edge end portion fixed within a convex bottom portion 18, 19 of the tower, preferably it is welded within lower bottom 18 by at least one welded joints 30 (FIG. 24). A guide means is also provided for a longitudinal slide movement of wall 168, said guide means preferably comprising a couple of longitudinal flat connection members 31 that extend along the whole height of tower 150. Also longitudinal flat connection members 31 may be connected to the tower, typically inside shell 17, by welded joints or any other suitable technique. holes 37 are made aligned parallel to long edges of the longitudinal wall. Similarly, holes 38 are made close and aligned parallel to the edge of each longitudinal flat connection member 31. Holes 37 and 38 are at a mutual distance according to a same distance sequence, such that the holes can face each other during the slide movement of wall 168 with respect to flat members 31. In each couple of holes 37 and 38 that face each other, there is a slotted hole and a circular one, or in any case one that is suitable to house by a tie-member 35, in particular as in the figure, by a screws stem portion. a nut 34 is arranged opposite to screw head 34', said nut engaging with the screw according to a predetermined locking force. A seal element 36 is arranged between longitudinal flat connection member 31 and wall 168, for example a Teflon® element, which ensures a fluid-tight connection between chamber 151 and chamber 152. Suitable sealing means may be also arranged at nut 34, as in the figure, or at screw head 34', which is located on the higher pressure side.

The elongated holes may have a length that increases moving away from the edge portion connected to the apparatus, in this case from the bottom of the apparatus, since the average thermal expansion is proportional to the distance from the constrained end. The tightening of the screws within the nuts, or of any other equivalent screw-threaded means, must ensure a fluid-tight connection between the chambers by sealing elements 36, without hindering the slide movement of wall 36.

By this arrangement, wall 168 is substantially free to deform as a consequence of thermal stresses.

Figure 28:
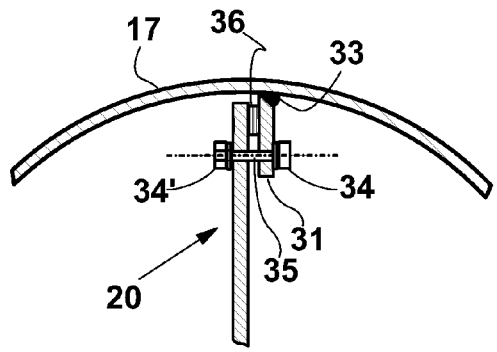
FIG. 28 is a cross sectional view of a detail of an exemplary embodiment of the tower of FIGS. 23 and 24.

In the exemplary embodiment of FIG. 28, seal element 36 is arranged nearer to the wall with respect to bolts 34'-34. This way, is not necessary to provide a seal element under screw head 34' or under nut 34.

Figure 29:
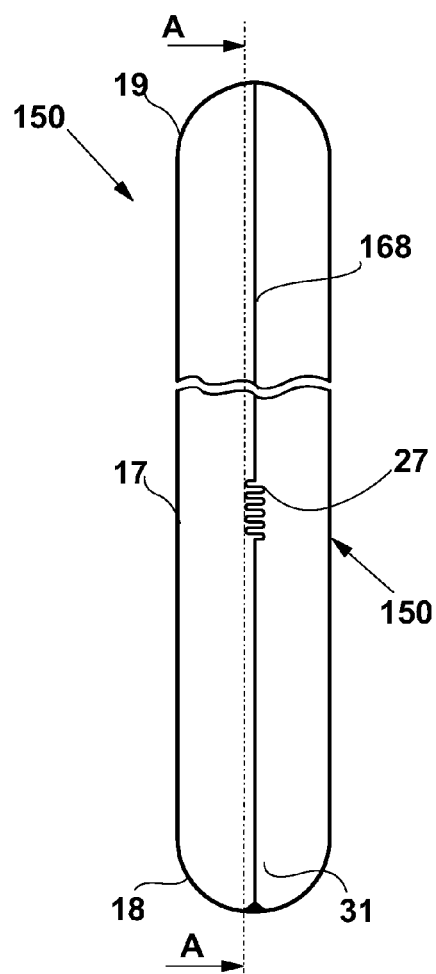
FIGS. 29 and 30 are diagrammatical longitudinal cross sectional views of an absorption tower according to the invention, with an inner partition double wall in which an alternative compensation means is provided with respect to FIGS. 12 and 13.
Figure 30:
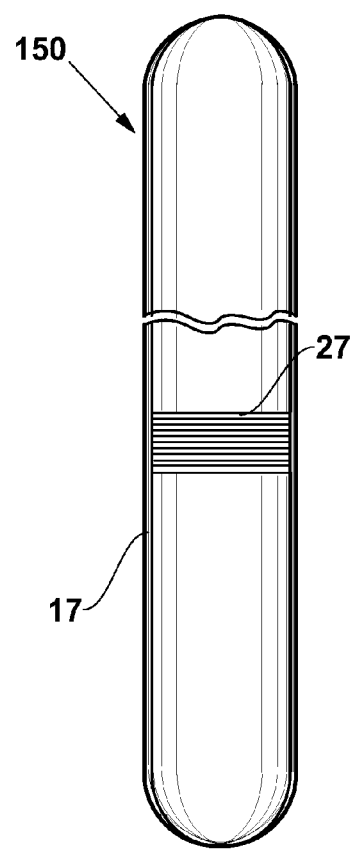
Figure 31:
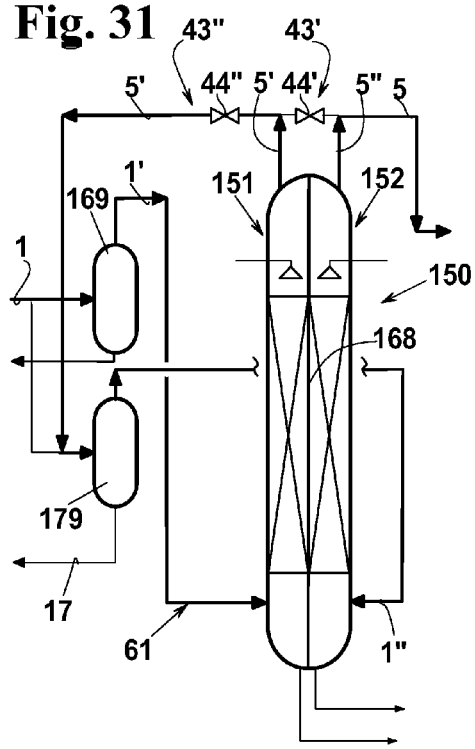
FIGS. 31, 32 and 33 are simplified diagrams of the apparatus of FIG. 1, in which shows the ways engaged by the gas in the series mode operation, in the parallel mode operation and in the exclusion mode operation of a treatment chamber.

In another exemplary embodiment, as shown in FIGS. 29 and 30, are provided integral expansion compensation means are provided in wall 168, which has a portion 27 of the wall that is deformable to allow a thermal expansion, or in any case a thermal deformation.

In a first exemplary embodiment, the compensation means comprise longitudinal slide guide members 31 that have the shape of longitudinal flat connection members, which are welded within the wall of the apparatus. The compensation means comprise an inner partition wall 168, in this case a diametrical wall, which is connected at a location of the apparatus, for example at a lower top location.

As diagrammatically shown in FIG. 35, in an advantageous exemplary embodiment, inner partition wall 168 is arranged such that the ratio of the area S2 of the cross sectional view of second sweetening chamber 152 to cross sectional area 51 of first sweetening chamber 151 is about one.

FIGS. 36 and 37 show the cross sections of sweetening towers 150' that comprise three sweetening chambers 152, 152',153 defined within the outer shell of tower 150' by two or three inner partition walls 168, respectively. In a represented exemplary embodiment, tower 150' has circular cross sections, in particular it has a cylindrical shape. The cross section of each sweetening chamber 152,152',153 may have various shapes, in particular they may have the shape of a circular segment (FIG. 36) or of a circular sector (FIG. 37), with the cross sections of partition walls 168 that have radial or parallel cross sections, respectively. Areas S1, S2, S3 of the cross sections are preferably substantially equal to one another.

FIG. 38 shows an arrangement 3 of an absorption chambers, which comprises a cylindrical chamber 153' that is co-axial to the tower FIGS. 39 and 40 show cross sections of a sweetening towers 150" that comprises four sweetening chambers 151", 152",153",154 defined by the outer shell of tower 150" and, respectively, by three or four inner partition walls 168. In a represented exemplary embodiment, tower 150" has a circular cross section, in particular it has cylindrical shape. The cross sections of each sweetening chamber 151",152",153", 154 may have various shapes, in particular they may have the shape of a circular segment (FIG. 39) or of a circular sector (FIG. 40), with the cross sections of partition walls 168 that have radial or parallel cross sections, respectively. Areas S1, S2, S3, and S4 of the cross sections are preferably substantially equal to one another. In the description of the method, hereinafter, reference is made to sweetening tower 150, which is equipped with two sweetening chambers 151,152, in any case the description can easily be extended to any of the towers 150' or 150". More in general, the description can easily being extended to a tower that has any higher number of sweetening chambers and/or sweetening chambers of different shapes.

Second sweetening chamber 152 comprises a third and a fourth inlet port 181 and 182, and a third and a fourth outlet port 183 and 184. Third inlet port 181 and fourth outlet port 184 are arranged at the upper end portion of second sweetening chamber 152, while third outlet port 183 and fourth inlet port 182 are arranged at the lower end portion of second vertical sweetening chamber 152.

Figure 34:
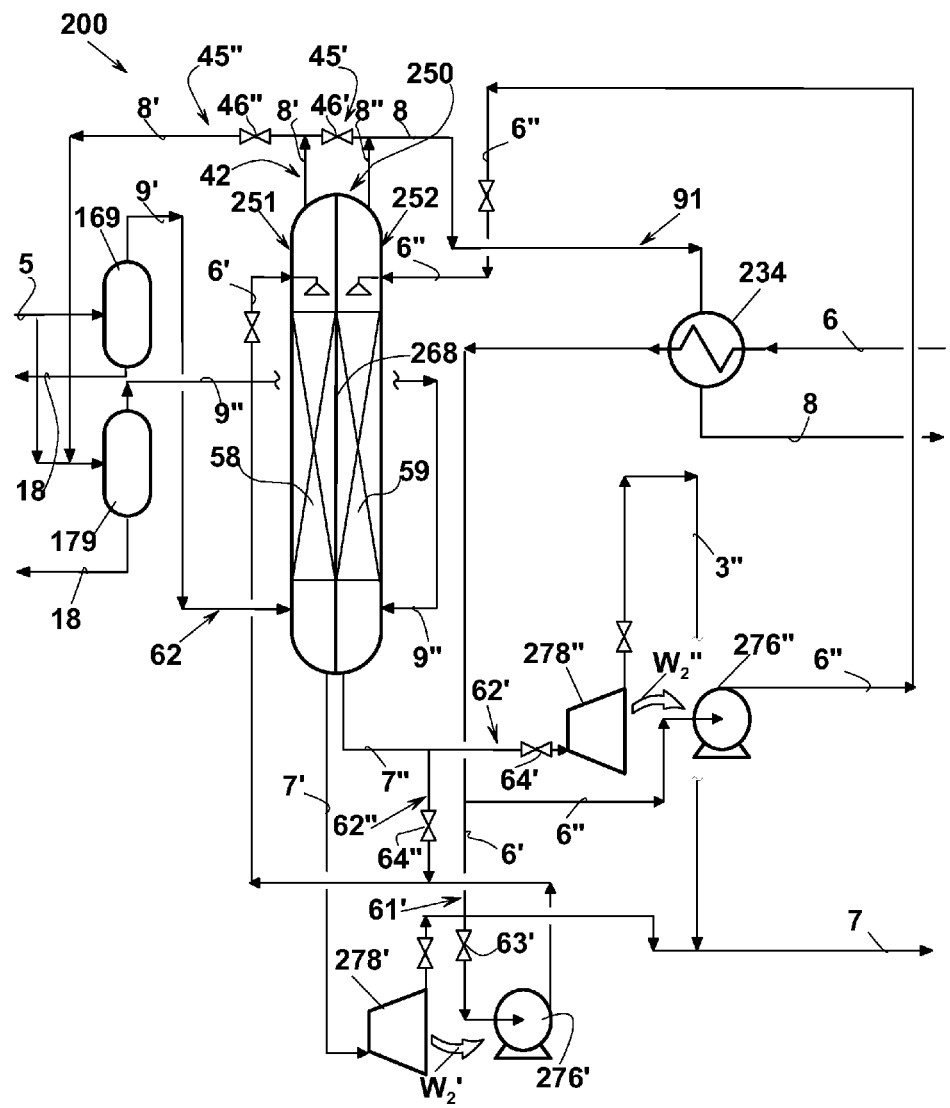
FIG. 34 diagrammatically represents a dehydration apparatus for a wet natural gas, which may be sweetened according to an exemplary embodiment of the invention.

With reference to FIG. 34, a method and an apparatus 200 are described for moisture removal treatment i.e. for a dehydration of a wet hydrocarbon gas stream, for example a wet natural gas after a sweetening treatment in an aqueous solution, or a gas that is wet due to native moisture. A vertical dehydration tower 250 is provided comprising an inner partition wall 268 that extends longitudinally within tower 250. Inner partition wall 268 defines a first dehydration chamber 251 and a second dehydration chamber 252 in tower 250, separated by inner partition wall 268.

For the exemplary embodiments of dehydration tower 250 it counts what was said by describing FIGS. 36-41, provided that the numbers 150, 151 . . . 168, with or without primes, are replaced with corresponding numbers 250, 251 . . . 268 which are therefore increased by 100.

With reference now to FIG. 43, first dehydration chamber 251 has a first and a second inlet port 271 and 272 and a first and a second outlet port 151 and 274. First inlet port 271 and second outlet port 274 are arranged at the upper end portion of dehydration chamber 251, whereas first outlet port 151 and second inlet port 272 are arranged at the lower end portion of vertical dehydration chamber 251.

Second dehydration chamber 252 has a third and a fourth inlet port 281 and 282 and a third and a fourth outlet port 283 and 284. Third inlet port 281 and fourth outlet port 284 are arranged at the upper end portion of dehydration chamber 252, whereas third outlet port 283 and fourth inlet port 282 are arranged at the lower end vertical dehydration chamber 252.

Still with reference again to FIG. 34, at least one part 9' of wet gas 5, for example a natural gas as extracted from a well or from a gasfield, or coming from a sweetening treatment like the one of FIG. 1, is subjected to a gravitational solid dust and liquid matter removal in a cyclone separator 269 or in an equivalent equipment. Wet gas 5 is then fed through second inlet port 272 into first dehydration chamber 251, from which it is extracted, as an at least partially dehydrated gas 8' through second outlet port 274. First dehydration chamber 251 is also supplied, through first inlet port 271, by at least one part 6' of dehydration liquid 6, for example a dehydration hygroscopic liquid of the previously described type. Dehydration liquid 6' flows down through first dehydration chamber 251, from which it is extracted as a portion of used or exhausted dehydration liquid 7' through first outlet port 151.

The method according to the invention provides a first "parallel" treatment mode of tower 250, of first and of second dehydration chamber 251, 252, in which also a second part 9" of wet gas 5 is subjected to a gravitational solid dust and liquid matter removal in a cyclone separator 279 or in an equivalent equipment. Wet gas 5 is then fed through second inlet port 282 into second dehydration chamber 252, from which it is extracted through second outlet port 284, as dehydrated gas 8". Moreover, second dehydration chamber 252 is also supplied with a second part 6" of dehydration liquid 6 through first inlet port 281. Dehydration liquid 6" flows down through second dehydration chamber 252, from which it is extracted through first outlet port 283 as a used or exhausted dehydration liquid 7".

In addition to the first treatment mode, or parallel-mode of first dehydration chamber 252 and of second dehydration chamber 153, the method provides a second operation mode or series-mode, in which partially dehydrated gas 8' may undergo a further gravitational solid dust and liquid matter removal in a cyclone separator 279 or in an equivalent equipment and is then fed through second inlet port 282 into second dehydration chamber 252, from which it is extracted, as a dehydrated gas 8", through second outlet port 284. Second dehydration chamber 252 is also supplied, through first inlet port 281, also by a second portion 6" of dehydration liquid 6. Dehydration liquid 6" flows down through second dehydration chamber 252, from which it is extracted through first outlet port 283 as a used or exhausted dehydration liquid 7".

In an exemplary embodiment of the second operation mode, in alternative to series operating of two dehydration chambers 251,252 an exclusion operation mode is provided in which only first dehydration chamber 251 (or second dehydration chamber 252) of dehydration tower 250 works, i.e. is traveled along by the flowrate of wet gas 9', which may coincide with the whole flowrate of gas to be treated, and is traveled along by dehydration liquid 6'.

The method provides also a step of switching from a parallel-mode to a series-mode or to an exclusion-mode of operating of first and of second dehydration tower 251,252, and/or a step of reverse switching. The step of switching may depend upon a step of determining the conditions of wet gas 5 to be treated. In particular, the step of switching from the parallel-mode to the series-mode or to the exclusion-mode may be carried out if the flowrate of wet gas 5 to be treated decreases below a predetermined minimum threshold value, which may occur during the operation life of a well or of a gasfield from which is gas 5 or 1 is extracted, and/or the step of switching from the series-mode or from the exclusion-mode to the parallel-mode may be carried out if the flowrate of wet gas 5 to be treated rises above a predetermined maximum threshold value, which may or may not coincide with minimum threshold value. This situation may occur, for example, at the start-up of a well of an existing gasfield in order to exploit more quickly the gasfield, or if the capacity of a gasfield has been initially underestimated or has not been intentionally exploited at a maximum rate.

In the exemplary embodiment of dehydration apparatus 200 of FIG. 35, a means is provided to carry out the step of switching from/to a parallel-mode to/from a series-mode or to an exclusion-mode.

In the exemplary embodiment shown, a selective convey means comprise a couple of two-way shut-off valves 46' and 46" arranged along outlet ducts 45' and 45" and in communication with second outlet port 274 of first treatment chamber 251. Duct 45' is connected to second outlet port 284 of second chamber 252, while duct 45" is connected to second inlet port 282 of second chamber 252 (FIG. 43). With valve 46' closed and valve 46" open, the streams of partially sweetened and sweetened gas 8',8" are kept separate, and the streams of sweetened gas 8' and 8" can be joined in the stream of sweetened gas 8 and to actuate the above described parallel-mode. With valve 46' open and valve 46" closed, the series-mode can be actuated, and with both valves 46', 46" closed the stream 8' (or 8") can be conveyed as a stream of sweetened gas 8, thus actuating the exclusion-mode of the first dehydration chamber, if second chamber 252 (or first chamber 251) is not fed.

In an exemplary embodiment, not shown, the selective convey means comprise a two-ways shut-off valve and a three-way diverting valve arranged in series between outlet duct 42 and ducts 45' and 45", such that with the two-way valve open and with the three-way valve open to ducts 45' or 45" the parallel-mode and the series-mode can be actuated, respectively, while with the two-way valve closed and with the three-way valve in one of the two above indicated positions the exclusion-mode of first dehydration chamber 251 can be actuated.

Apparatus 200 may comprise an automatic selection means for automatically changing the treatment mode of dehydration apparatus 200 according to the flowrate value of the gas to be treated, similarly to what already described. The automatic selection means may comprise a flowrate sensor, not shown, which is mounted on a duct 62, for measuring the flowrate of gas 9' to be dehydrated, and is arranged to produce a flowrate signal, or may can use a sensor of flowrate arranged on duct 61 of FIG. 1, in case of a series arrangement of apparatuses 100 and 200 for sweetening and dehydrating hydrocarbon acid gas 1. Similarly, a control means is provided that operates the actuators of valves 46' and 46" according to value of a flowrate signal, or operates valves corresponding to valves 48 and 49, in order to select a mode between the series-mode, the exclusion-mode and the parallel-mode.

The method provides steps of treating, i.e. of distributing and of regenerating and/or discharging exhausted dehydration liquid 7' and/or 7" coming from first and/or from second dehydration chamber 251 and/or 252. In particular, a "parallel" distribution is provided, in which the streams of dehydration liquid 6' and 6" are two portions of the stream of dehydration liquid coming from a storage or from a regeneration unit, respectively, and supply dehydration chambers 251 and 252 through pumps 276' and 276". The streams of both above-mentioned exhausted dehydration liquid 7' and exhausted liquid 7", above defined, are expanded in a rotatable expansion means, specifically in a respective turbine 278' and 278", and are joined in the stream of exhausted dehydration liquid 7. Pumps 276' and 276" may be associated with turbines 278' and 278", respectively, in order to use kinetic energy $W_2'$, $W_2"$ of the impeller of two turbines 278' and 278" respectively.

In alternative, a "series" distribution is provided wherein, in the exemplary embodiment of FIG. 35, the stream of dehydration liquid 6 is supplied to second dehydration chamber 252 as stream 6", and the stream of exhausted dehydration liquid 7" is supplied to first dehydration chamber 251 as stream 6' with the possible aid of an impelling pump, not shown.

The method may provide a step of switching from the parallel distribution of dehydration liquid 7', 7" to the series distribution, and/or vice-versa. In particular, the step of switching from the series distribution to the parallel distribution, and vice-versa, may be carried out substantially at the same time of the step of switching from the parallel dehydration mode of wet gas 5 to the mode of series dehydration, and vice-versa, as described above.

In the exemplary embodiment of dehydration apparatus 200 shown in FIG. 35, a means is provided for actuating the step of switching from/to a parallel distribution of the dehydration liquid to/from a series distribution, said switch means comprising, for example, a shut-off two-way valve 63' arranged along a feed line 61' of dehydration liquid 6' into first dehydration chamber 251, and a couple of shut-off two-way valves 64', 64" arranged along outlet lines 62', 62" from second dehydration chamber 252. With valves 63' and 64' open and with valve 64" closed, the feed streams of dehydration liquid 6' and 6" are kept separate as well as the streams of exhausted dehydration liquid 7' and 7", and it is possible to actuate the parallel distribution. In this case, the streams of exhausted dehydration liquid 7' and 7" are joined into the stream of exhausted dehydration liquid 7 to regenerating after expanding in respective turbine 278' and 278". In alternative, with valves 63' and 64' closed and with valve 64" open, the stream of exhausted dehydration liquid 7" coming from second dehydration chamber 252 forms the stream of dehydration liquid 6' that is supplied to first dehydration chamber 251, possibly by means of an impelling pump, not shown, thus actuating the series distribution. The stream of exhausted dehydration liquid 7' expands in turbine 278' and forms the stream of exhausted dehydration liquid to be regenerated. In an exemplary embodiment, not shown, the stream of dehydration liquid 6 may be supplied to first dehydration chamber 251, and the stream of exhausted dehydration liquid 7' of the first dehydration chamber is supplied to second dehydration chamber 252 as stream 6".

After leaving dehydration tower 250, dehydrated gas 8 engages a duct 91 along which a heat exchanger 234 may be arranged for controlling the temperature of stream 6 of dehydration liquid coming from a storage or from a regeneration unit.

The above description is referred to a method and to apparatuses 100, 200 for sweetening and dehydrating a natural gas containing acid compounds, but the same can be repeated for other fuel gas that require in any case a treatment for removing both acid gas, in particular carbon dioxide and hydrogen sulfide, and water, for example for a gas associated to an oilfield or for a refinery gas fraction coming from the crude oil atmospheric distillation, for a gas from a conversion plant (desulphurization, thermal or catalytic cracking, visbreaking, coking) or other gas from a refinery, a petrochemical plant, a chemical plant in general, coking or gas from plants that make gas produced by a degradation and/or fermentation process, for example a biogas.

Even if in FIGS. 1, 35, 42, 43 treatment chambers have been shown that contain a gas-liquid contact means consisting of beds of packings 58,59, according to the symbols that are used, it is to be understood that the contact means may be of any other type, for example it may comprise trays that are well known in the technique of mass exchange operations involving a gas stream and a liquid stream.

Even if in the above description, with reference to the diagrams of FIGS. 1, 24 and 35, reference is made to apparatuses 100, 200 that comprise containers 150, 250 within each of which only two treatment chambers are defined, the same description may be extended, which is evident for a skilled person, to the case of containers comprising a higher number of treatment chambers, for example containers whose cross section is shown in FIGS. 7 to 12. In this case, a selective convey means may be provided that comprises a systems of shut-off and/or diverting valves configured to provide a parallel-mode arrangement of two or more treatment chambers, or even of all the treatment chambers that are contained within the container, or series-mode arrangement of one or more chambers contained within the same container.

The foregoing description of an exemplary embodiment of the method and of the apparatus according to the invention and of a way to use the apparatus, will so fully reveal the invention according to the conceptual point of view, such that others, by applying current knowledge, will be able to modify and/or adapt for various applications this exemplary embodiment without further research and without parting from the invention, and it is therefore to be understood that such adaptations and modifications will have to be considered as equivalent to the exemplary embodiment. The means and the materials to realise the different functions described herein could have a different nature without, for this reason, departing from the field of the invention. It is to be understood that the phraseology or terminology employed herein is for the purpose of description and not of limitation.

What is claimed is:

1. An apparatus (100,200) for removing a component from a hydrocarbon gas (1',1"), said apparatus comprising:
   a vertical elongated container (150) comprising at least one substantially vertical inner partition wall (168) in said vertical elongated container, said at least one inner partition wall defining at least two treatment chambers within said container (151,152), each of said at least two treatment chambers having: a respective first inlet port (171,181);
   a second inlet port (172,182);
   a first outlet port (173,183);
   a second outlet port (174,184);
   wherein said first inlet port (171,181) and said second outlet port (174,184) are arranged at an upper end of each treatment chamber (151,152);
   wherein said first outlet port (173,183) and said second inlet port (172,182) are arranged at a lower end each treatment chamber (151,152);
   a feeding means for feeding a treatment liquid (2',2") into at least one of said at least two treatment chambers (151,152) through said respective first inlet port (171,181), and a liquid extraction means for extracting said treatment liquid as a used treatment liquid (3',3") through said respective first outlet port (173,183) of said at least one of said at least two treatment chambers (151,152);
   wherein said feeding means of said treatment liquid is adapted to feed a treatment liquid selected from the group consisting of:
   a sweetening liquid that is a liquid adapted to receive an acid compound present in said hydrocarbon gas to be treated; and
   a dehydration liquid that is a liquid adapted to receive moisture present in said hydrocarbon gas to be treated;
   a feeding means of said hydrocarbon gas (1',1") into at least one of said at least two treatment chambers (151,152) through said respective second inlet port (172,182), and a gas extraction means for extracting said hydrocarbon gas as a treated gas (8',8") through said respective second outlet port (174,184) of said at least one of said at least two treatment chambers (151,152);
   wherein, in said at least one of said at least two treatment chambers (151,152), said treatment liquid (2',2") comes into contact with said hydrocarbon gas (1',1") and receives said component from said hydrocarbon gas (1',1"), and that said hydrocarbon gas (1',1") is changed into a treated gas (5',5") in which said component has said treated gas concentration;
   a selective convey means (44',44",46',46",48,49) for carrying out a treatment mode of said hydrocarbon gas selected from the group consisting of:
   a series-mode, wherein said hydrocarbon gas (1',1") flows along a first treatment chamber (151) and then along a second treatment chamber (152) of said at least two treatment chambers, and said treated gas is extracted only from said second treatment chamber (152);
   a parallel-mode, wherein said hydrocarbon gas (1',1") is directly fed into said first treatment chamber (151) and into said second treatment chamber (152), and portions of treated gas are extracted from both said first and said second treatment chambers (151,152); and
   an exclusion-mode wherein said treated gas is fed/extracted to/from a single treatment chamber selected among said first treatment chamber (151) and said second treatment chamber (152);
   wherein an inner longitudinal partition wall (83,168,89) is arranged within said vertical elongated container, said inner longitudinal partition wall (83,168,89) defining in said vertical elongated container said first chamber (151) and said second chamber (152), and
   wherein a means is provided for compensating a mechanical deformation of said inner partition wall (168), said mechanical deformation due to a process condition difference between said first chamber (151) and said second chamber (152), in particular said mechanical deformation due to temperature and/or pressure differences between said first chamber (151) and said second chamber (152).

2. The apparatus according to claim 1, wherein said compensation means of said mechanical stress due to a temperature difference between said first chamber (151) and said second chamber (152) comprises an inner partition wall (168) comprising a movable element (20) that has an own edge end portion fixed within a convex bottom portion of said tower connected to an own end edge portion within a convex bottom portion (18,19) of said tower (150), and a guide means is provided for guiding the longitudinal slide movement of the movable element (20).

3. The apparatus according to claim 2, wherein said guide means to the sliding longitudinal comprise at least one longitudinal flat connection member (31,32) connected longitudinally to said shell (17) of said tower (150).

4. The apparatus according to claim 3, wherein said movable element (20) and said longitudinal flat connection member (31,32) comprise respectively a first plurality of holes (37) and a second plurality of holes (38) arranged along respective own lateral edges, according to a same sequence of centre hole distances (L), in order to form couples of corresponding holes of said movable element and of said flat connection member wherein a hole (37) of said first plurality of holes faces a corresponding hole (38) of said second plurality of holes during a slide movement of said movable element (20) with respect to said flat connection member (31,32), wherein at least one hole (37,38) of each of said couples of corresponding holes is slotted along a longitudinal direction.

5. The apparatus according to claim 4, wherein said slotted holes (38) have a slot length that increases along said movable element (20) and/or along said flat connection member (31,32), said movable element (20) and/or said flat connection member (31,32) arranged such that said slot length increases moving away from said fastened edge portion.

6. The apparatus according to claim 1, wherein said inner partition wall (168) has an expansion compensation element that comprises a deformable portion of said inner partition wall (168).

7. The apparatus according to claim 1, wherein said mechanical stress means compensation means due to a pressure difference between said first chamber (151) and said second chamber (152) comprises said inner partition wall (168) made according to two flat elements (21,22) parallel to each other, in particular said inner partition wall (168) is a double wall connected to the container in particular by means of welded joints (33,33').

8. The apparatus according to claim 7, wherein, in order to allow making welded joints in the space between two flat elements (21,22), each plane element (21,22) comprises a flat connection member (31, 32) that is internally connected to the shell by a fillet welded joint (17), and a portion (21', 22') connected to the respective flat connection member (31, 32) by a full penetration butt welded joint (34, 34').

9. The apparatus according to claim 7, wherein said inner partition wall (168) according to two flat elements (21, 22) parallel comprises transversal stiffening elements therebetween (23).

10. The apparatus according to claim 1, wherein said inner partition wall (168) comprises two parallel flat elements (21, 22) fluid-tightly arranged with said container (17,18,19), such that an overpressure can be created therebetween.

11. The apparatus according to claim 9, wherein said transversal stiffening elements (23) are perforated to allow a hydraulic continuity of the space between said planes parallel to each other.

12. The apparatus according to claim 7, wherein said inner partition wall (168) consisting of two parallel flat elements (21,22) comprises said parallel flat elements (21,22) made in the form of a movable element (20) that has an own edge end portion fixed within a convex bottom portion (18,19) of said tower (150), and a guide means is provided for guiding the longitudinal slide movement of said movable element (20).

13. The apparatus according to claim 1, comprising an automatic selection means associated with said selective convey means (44',44",46',46",48,49), said automatic selection means comprising:
 a means for detecting the flowrate of said hydrocarbon gas to be treated (1',1",9',9"), said means for detecting the flowrate arranged to produce a flowrate signal;
 an actuating means that is arranged to receive said flowrate signal and to actuate:
 said series-mode or of said exclusion-mode when said flowrate signal indicates that the flowrate of said hydrocarbon gas to be treated (1',1",9',9") decreases below a predetermined first flowrate threshold value; and
 said parallel-mode, when said flowrate signal indicates that the flowrate of said hydrocarbon gas to be treated (1',1",9',9") rises above a predetermined second flowrate threshold value.

14. The apparatus (100,200) according to claim 1, comprising a means (53',54',54") for choose a distribution of said treatment liquid (2,6) selected from the group consisting of:
 a parallel distribution, wherein said treatment liquid is split into two streams (2',2") that are fed into respective treatment chambers (151,152); and
 a series distribution, wherein said treatment liquid (2") is fed into a single chamber (152) of said two treatment chambers, and said exhausted treatment liquid (3") is fed as a treatment liquid (2') into the other chamber (151) of said two treatment chambers.

15. The apparatus (100,200) according to claim 1, wherein said at least one inner partition wall (168,268) defines only two treatment chambers (151,152) within said container.

16. The apparatus according to claim 1, comprising a first container (150) that is parted into a plurality of sweetening chambers (151,152), a second container (250) that is parted into a plurality of dehydration chambers (251,252), and a gas convey means for conveying (90) said treated gas (5) coming from at least one of said sweetening chambers into at least one of said dehydration chambers.

* * * * *